United States Patent
Raanani et al.

(10) Patent No.: US 10,367,940 B2
(45) Date of Patent: *Jul. 30, 2019

(54) ANALYZING CONVERSATIONS TO AUTOMATICALLY IDENTIFY PRODUCT FEATURE REQUESTS

(71) Applicant: AffectLayer, Inc., Tel Aviv-Jaffa (IL)

(72) Inventors: Roy Raanani, Mill Valley, CA (US); Russell Levy, Raanana (IL); Micha Yochanan Breakstone, Raanana (IL); Dominik Facher, San Francisco, CA (US)

(73) Assignee: AffectLayer, Inc., Tel Aviv-Jaffa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,751

(22) Filed: Feb. 22, 2018

(65) Prior Publication Data
US 2018/0183930 A1 Jun. 28, 2018

Related U.S. Application Data

(63) Continuation-in-part of application No. 15/168,675, filed on May 31, 2016, now Pat. No. 10,051,122.
(Continued)

(51) Int. Cl.
*H04M 3/00* (2006.01)
*H04M 5/00* (2006.01)
(Continued)

(52) U.S. Cl.
CPC .......... *H04M 3/5175* (2013.01); *G06F 15/76* (2013.01); *G06F 16/3329* (2019.01); *G06F 16/3344* (2019.01); *G06F 17/21* (2013.01); *G06F 17/277* (2013.01); *G06F 17/2785* (2013.01); *G06F 17/28* (2013.01); *G06N 20/00* (2019.01);
(Continued)

(58) Field of Classification Search
CPC ........... H04M 3/42221; H04M 3/5232; H04M 2203/556; H04M 2203/551; H04M 3/5191
USPC .............. 379/265.07, 265.05, 265.06, 266.1, 379/265.03
See application file for complete search history.

(56) References Cited

U.S. PATENT DOCUMENTS 6,937,705 B1 * 8/2005 Godfrey .............. H04M 3/2281
379/26.01
7,729,916 B2 6/2010 Coffman et al.
(Continued)

OTHER PUBLICATIONS

Notice of Allowance dated May 4, 2018 of U.S. Appl. No. 15/168,675 by Raanani, R., et al., filed May 31, 2016.
(Continued)

*Primary Examiner* — Thjuan K Addy
(74) *Attorney, Agent, or Firm* — Perkins Coie LLP

(57) ABSTRACT

A feedback identification system to automatically determine product feature requests by analyzing conversations of representatives with customers. The feedback identification system retrieves recordings of various conversations, extracts features of the conversations, and analyzes the features to determine a set of features that is indicative of a feature request. A feature request is a request for adding a specified functionality to a product. The set of features is analyzed to generate a feedback manifest, which includes the feature request (a) as a summary of what is discussed in the conversations or (b) verbatim from the conversations.

27 Claims, 11 Drawing Sheets

Related U.S. Application Data

(60) Provisional application No. 62/169,456, filed on Jun. 1, 2015, provisional application No. 62/169,445, filed on Jun. 1, 2015.

(51) Int. Cl.
| | | |
|---|---|---|
| *H04M 3/51* | (2006.01) | |
| *G06F 17/27* | (2006.01) | |
| *G06F 17/28* | (2006.01) | |
| *G10L 15/183* | (2013.01) | |
| *G06F 17/21* | (2006.01) | |
| *G06N 20/00* | (2019.01) | |
| *G06F 15/76* | (2006.01) | |
| *G06F 16/33* | (2019.01) | |
| *G06F 16/332* | (2019.01) | |
| *G10L 15/08* | (2006.01) | |

(52) U.S. Cl.
CPC ...... *G10L 15/183* (2013.01); *G10L 2015/088* (2013.01); *H04M 2201/40* (2013.01)

(56) References Cited

U.S. PATENT DOCUMENTS

| 8,165,886 | B1 | 4/2012 | Gagnon et al. |
| 8,346,563 | B1 | 1/2013 | Hjelm et al. |
| 9,785,891 | B2 * | 10/2017 | Agarwal ............... G06N 20/00 |
| 2004/0249632 | A1 | 12/2004 | Chacon |
| 2005/0197841 | A1 | 9/2005 | Al-Dhubaib et al. |
| 2007/0265850 | A1 | 11/2007 | Kennewick et al. |
| 2008/0103781 | A1 | 5/2008 | Wasson et al. |
| 2008/0140415 | A1 | 6/2008 | Shostak |
| 2009/0150156 | A1 | 6/2009 | Kennewick et al. |
| 2014/0317030 | A1 | 10/2014 | Shen et al. |
| 2015/0256675 | A1 | 9/2015 | Sri et al. |
| 2016/0225372 | A1 | 8/2016 | Cheung et al. |
| 2016/0352902 | A1 | 12/2016 | Levy et al. |

OTHER PUBLICATIONS

U.S. Appl. No. 16/017,646 of Raanani, R. et al. filed Jun. 25, 2018.
Non-Final Office Action dated Jan. 24, 2018 of U.S. Appl. No. 15/168,675 by Raanani, R., et al., filed May 31, 2016.

* cited by examiner

10,367,940 B2

ANALYZING CONVERSATIONS TO AUTOMATICALLY IDENTIFY PRODUCT FEATURE REQUESTS

CROSS-REFERENCE TO RELATED APPLICATION(S)

This application is a continuation-in-part of U.S. application Ser. No. 15/168,675 titled "MODELING VOICE CALLS TO IMPROVE AN OUTCOME OF A CALL BETWEEN A SALES REPRESENTATIVE AND A CUSTOMER" filed May 31, 2016, which claims the benefit of U.S. Provisional Application Ser. No. 62/169,456 titled "MODELING VOICE CALLS TO IMPROVE AN OUTCOME OF A CALL BETWEEN A SALES REPRESENTATIVE AND A CUSTOMER" filed Jun. 1, 2015, and U.S. Provisional Application Ser. No. 62/169,445 titled "COORDINATING VOICE CALLS BETWEEN SALES REPRESENTATIVES AND CUSTOMERS TO INFLUENCE AN OUTCOME OF THE CALL" filed Jun. 1, 2015, all of which are incorporated herein by reference for all purposes in their entirety.

BACKGROUND

With over 2.4 million non-retail inside sales representatives in the United States (U.S.) alone, millions of sales phone conversations are made on a daily basis.[i] However, except for rudimentary statistics concerning e.g., call length and spotted keywords and phrases, sales conversations are left largely unanalyzed, rendering their content inaccessible to modeling, and precluding the ability to optimize them for desired outcomes. Recent advances in automatic speech recognition (ASR) technologies, and specifically in large vocabulary continuous speech recognition (LVCSR), are for the first time enabling high-accuracy automatic transcription of conversations. At the same time, natural language processing (NLP) approaches to both topic modeling and world-knowledge modeling, have become much more efficient due to the availability of large, freely accessible natural language corpora (e.g., CommonCrawl), as well as freely available ontologies or "knowledge graphs" (e.g., DBpedia). Finally, recent research on affect identification applying machine learning (ML) has been able to successfully model subjective aspects of emotion and personality traits as perceived by listeners.

[i]Insidesales.com "Market size 2013" study

DETAILED DESCRIPTION

Figure 1:
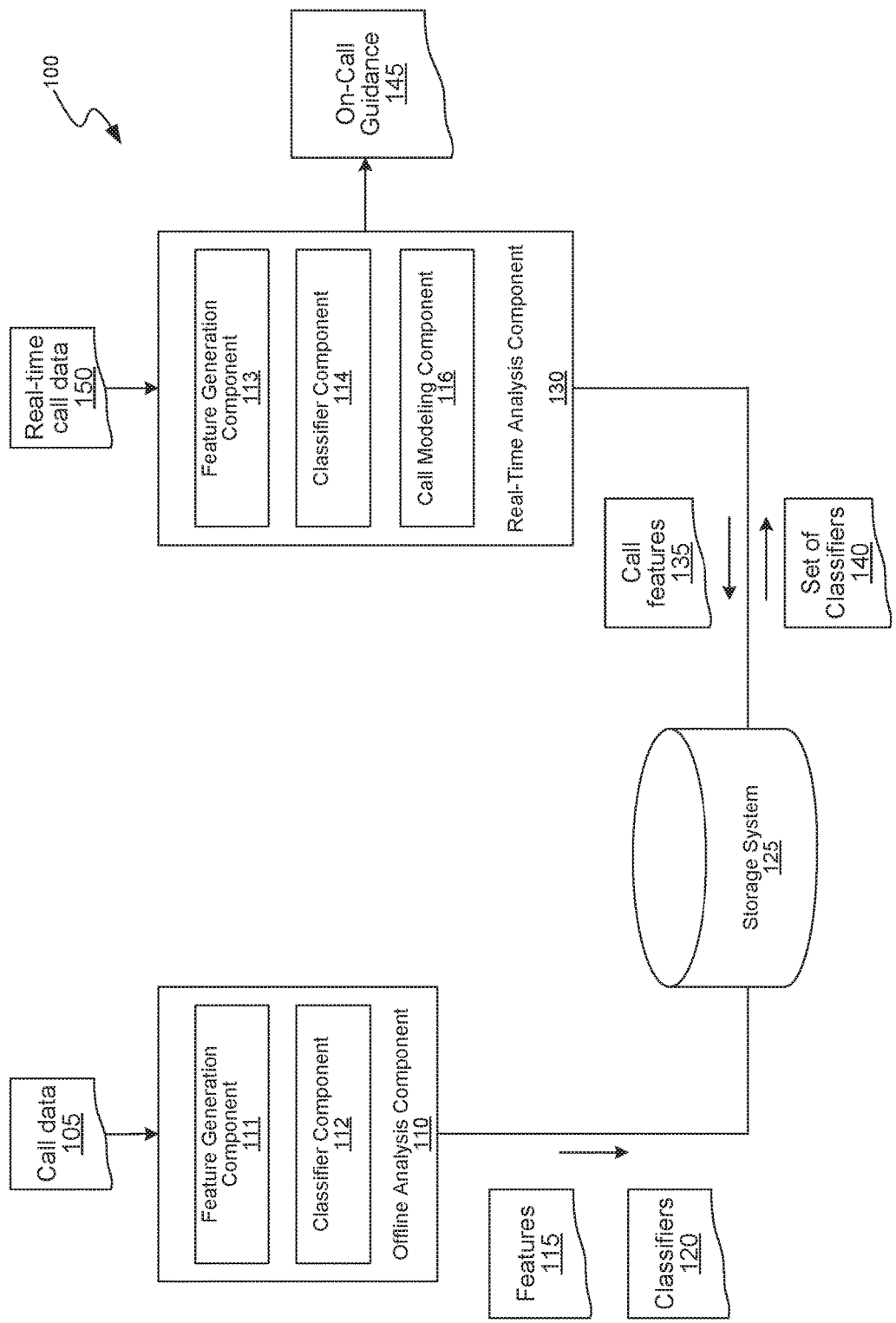
FIG. 1 is a block diagram of a call-modeling system in which the disclosed embodiments can be implemented.

Embodiments are disclosed for a call-modeling system for modeling conversations, e.g., voice conversations, in real time, with the goal of helping users, e.g., sales representatives and/or their managers, to improve and/or guide the outcome of conversations with other users, e.g., customers. One such embodiment can model the calls based on characteristics of the conversation, e.g., voice of the representatives and/or the customers, and content of the conversation, with the goal of positively influencing the outcome of the call. The call-modeling system can generate real-time probabilities for possible outcomes of a real-time conversation, e.g., an ongoing conversation between a specific representative and a customer, and generate specific on-call guidance, which may be either conducive or detrimental to a desired conversation outcome. The generated probabilities and on-call guidance may be used by the representatives and/or their managers to either increase the probability of a desired outcome and/or optimize the conversation for a specified duration if the predicted outcome is not going to be a desired outcome. For example, for renewing a magazine subscription, the call-modeling system can generate an on-call guidance suggesting a representative to engage in a rapport building exercise with the customer if it is determined that doing so increases the chances of the customer renewing the membership by 45%. On the other hand, if the call-modeling system predicts from the on-going conversation that the customer is not going to renew the subscription membership, then the call-modeling system can suggest the representative to wrap up the conversation as soon as possible.

The call-modeling system can include (i) an offline analysis component and (ii) a real-time analysis component. The offline analysis component can take as input conversations between a calling party, e.g., a customer, and a called party, e.g., a representative, and process the conversations using multiple distinct components to generate multiple features of the conversations. In some embodiments, the conversations can be audio recordings of calls between called party and the calling party (collectively referred to as "participants"). The features can include transcripts of audio recordings, vocabulary, semantic information of conversations, summarizations of utterances and various natural language entailments, summarization of a call, voice signal associated features (e.g., a speech rate, a speech volume, a tone, and a timber), emotions (e.g., fear, anger, happiness, timidity, fatigue), personality traits (e.g., trustworthiness, engagement, likeability, dominance, etc.), personal attributes (e.g., an age, an accent, and a gender), customer-representative pair attributes that indicate specific attributes associated with both the speakers that contribute to a specified outcome (e.g., similarity of speech rate between the representative and the customer, extrovert/introvert matching, or gender or age agreement).

Note that a recording of the conversation can be of a conversation that is any of telephone based, Voice over Internet Protocol (VoIP) based, video conference based, Virtual Reality (VR) based, Augmented Reality (AR) based, or based on any online meetings, collaborations or interactions, electronic mail (e-mail). The recording can also be of a conversation that has happened between two or more speakers physically located in the same room. In some embodiments, a recording based on any online meetings, collaborations or interactions, or email can be a transcript of the corresponding interaction.

Further, the features can include not only aural features, but also non-aural features, e.g., visual features such as body language of a participant, and facial expressions of the participant, or any combination of aural and non-aural features. The features could also be generated from the transcripts of any of emails, online messages, and online meetings. In some embodiments, any of a word, a phrase, a text, emoji, symbols, or a combination thereof can be used to determine a particular feature. For example, it can be determined that a text such as "Ha Ha" or "rofl" in the transcript can indicate laughter.

In some embodiments, the audio recordings can be tagged with various tags, e.g., a tag that indicates a trait (e.g., "extrovert", "trustworthy voice", "anxious", etc.) of one or more of the participants, a tag that indicates a call outcome (e.g., "sales closed", "sales failed", or "follow-up call scheduled"), and/or a tag that indicates "key moments" of a conversation. A "key moment" or a "moment" can be a specific event or a specific characteristic which occurs in the call. The event can be any event that is of specific interest for a specific application for which the call-modeling system is being implemented. An administrator of the call-modeling system can configure what events in a call have to be identified as a moment. For example, a moment can be laughter, engagement, fast-talking, open-ended questions, objections, or any combination thereof in a conversation. In some embodiments, the moments are identified automatically by a moment identification system. The tags can be generated automatically by the call-modeling system, manually, e.g., by human judgment, or both. In some embodiments, the tags are generated automatically by the call-modeling system. The tag can include various details, e.g., information regarding a moment, a time interval at which the moment occurred in the call, duration for which the moment lasted, information regarding the participants of the call, etc.

The moments can also be notified to and/or shared between the participants during an on-going conversation and/or after the conversation. For example, during a call between a customer and a representative, the call-modeling system can analyze the call, identify the moments in the conversation, and tag, notify and/or share the moments with the representative's manager, peers or other people. The shared moments can be used for various purposes, e.g., for coaching the representatives in handling the calls to improve outcomes of the calls based on various situations. The moments can be shared using various means, e.g., via email, a chat application, or a file sharing application.

In some embodiments, the offline analysis component uses distinct components to extract the features. The components can include an automatic speech recognition (ASR) component, which can produce a transcription of the conversation, a natural language processing (NLP) component, which can extract semantic information (such as open-ended questions asked, key objections, etc.) from the conversation, an affect component, which can analyze the recording for emotional signals and personality traits (e.g., likeability and trustworthiness), and a metadata component, which can extract data regarding conversation flow (i.e., who spoke when, and how much silence and overlap occurred).

The offline analysis component can analyze the features to generate one or more classifiers that indicate conversation outcomes, e.g., "sales closed", "sales failed." Each of the classifiers indicates a specific outcome and can include a set of features that contribute to the specific outcome. The offline analysis component can generate multiple classifiers for the same outcome; however, the multiple classifiers can have distinct sets of features. In some embodiments, the offline analysis component can analyze the features using a machine learning algorithm (e.g., a linear classifier, such as a support vector machine (SVM), or a non-linear algorithm, such as a deep neural network (DNN) or one of its variants) to generate the classifiers.

In some embodiments, the offline analysis component generates a classifier for different time intervals or time windows of the conversations. For example, the offline analysis component can analyze the extracted features for seconds 00:05-00:10 of a conversation, seconds 00:20-00:30, and minutes 1:00-2:00, and generate a classifier for each of those time windows. The offline analysis component feeds the extracted features into the machine-learning algorithm to produce multiple classifiers corresponding to the time windows. The time windows can be of varying lengths or fixed lengths. In some embodiments, the offline analysis component can generate classifiers for other relative positions of a conversation. For example, the offline analysis component can generate a classifier corresponding to an instance in the conversation, e.g., when a customer spoke for the first time in the conversation, and analyze features such as a pitch of the voice, a topic the customer spoke about first, and the length of the customer's first talk, to generate the classifier.

The real-time analysis component uses the classifiers to model a real-time conversation, e.g., an ongoing call between a representative and a customer, that helps the representative to increase a probability of a desired outcome of the conversation or optimize the conversation duration in case the real-time analysis component does not predict the desired outcome. The real time analysis component receives real-time call data of an ongoing conversation between the customer and a representative and analyzes the real-time call data to generate a set of features, e.g., using the offline analysis component as described above. The real-time analysis component can then feed the features to the classifiers to generate probabilities of potential outcomes of the call. The real-time analysis component can use the classifiers with highest prediction powers to generate the probabilities of various potential outcomes. In some embodiments, the real-time analysis component measures the prediction powers of the classifiers using an F-score, which, in statistical analysis, is a (possibly weighted) harmonic mean of precision and recall.

The real-time analysis component feeds the extracted features into the classifiers with high F-scores to generate probabilities of possible outcomes. Based on the probabilities, the real-time analysis component can also generate on-call guidance, which encourages the representative and/or their managers to modify, desist or persist with a specified on-call behavior to increase or decrease the probability of one of the possible outcomes, e.g., a desired outcome such as closing a sale. In some embodiments, the on-call guidance includes a set of suggested features and their values to be adopted, desisted or persisted with by the representative. For example, the on-call guidance can include instructions for the representative to change the rate of speech (e.g., speak slower), use specific key words, or pose more open-ended questions to the customer.

In some embodiments, the on-call guidance can change as the call progresses, e.g., based on the classifiers that are relevant to the call at that particular time of the conversation. For example, during the first two minutes of the call, a classifier that corresponds to the first two minutes of the call may be used to generate the on-call guidance such as instructing the representative to pose open-ended questions to the customer, and then in the third minute, a classifier that corresponds to the third minute of the call may be used to revise the on-call guidance, e.g., suggest to the representative to adjust the speech rate to match with that of the customer.

Additionally, if according to the classifiers, the real-time analysis component predicts the conversation to fail, the on-call guidance may suggest to the representative to quickly wrap up the call in order to spare the representative's time. The on-call guidance of the real-time analysis module may be presented on-screen or via any other interface (e.g., voice instructions given through an ear piece) to the representative and/or the manager. The embodiments can produce real-time probabilities of various outcomes of the conversations, enabling live coaching that can help the representatives in improving the outcomes of the conversations in real-time.

Embodiments are also disclosed for a feedback identification system that identifies feature requests and/or customer pain points based on an analysis of the conversations between the representatives and the customers. In some embodiments, a feature request is a request for adding a specified functionality to a product. For example, a feature request associated with a software product, such as an email application, can be a request for integrating the email application with an instant messaging application. The feature request is typically made by a customer or a prospective customer though it can be made by other entities in a conversation, e.g., a representative. The feedback identification system retrieves recordings of various conversations, extracts features of each of the conversations, and analyzes the features to determine if any of the conversations includes features that are indicative of a feature request made in the corresponding conversation. Example of a feature of a conversation that can be indicative of a feature request can include usage of words or phrases in the conversation such as "We would love if the email application has an integration with an instant messaging application." Upon identifying a set of features in a conversation that is indicative of a feature request, the feedback identification system generates information regarding the feature request based on the set of features, e.g., as a feedback manifest. An example of a pain point for an email application could be the difficulty of using the application with a specific Operating System or the difficulty of integrating it with existing databases.

The feedback identification system analyzes the features of a conversation to determine if any of the features are indicative of a feature request. The features to be analyzed could be any of the various features described above. In some embodiments, the feedback identification system can extract features based on the usage of words or phrases in the conversation. For example, the feedback identification system can be configured to identify words or phrases in the conversation such as "Could you provide an integration with an instant messaging application?", "I would like to see an export to spreadsheet option", or "the product should have a 'select all' and 'delete all' option", as features that are indicative of a feature request. In some embodiments, the features may be indicative of the feature request implicitly, i.e., where the feature request is not stated by any of the speakers in the conversation explicitly. For example, the feedback identification system can be configured to identify words or phrases such as "Are you using our new charts?" by one speaker in a conversation and "Yes! Love them! We've actually hired a data scientist to create a linear regression that predicts churn from your charts" by another speaker in the conversation as features that are indicative of a feature request (e.g., for creating a linear regression that predicts a customer churn within the product so as to obviate the need for a data scientist). In another example, a phrase such as "Another product in the market has those functionalities" (where "those" refers to something previously stated in the conversation) can be identified as features that are indicative of a feature request. That is, the feedback identification system derives a feature request from what is expressed in previous or subsequent statements of the conversation.

The feedback manifest can include the feature requests as one or more of (a) a verbatim version one or more features in the corresponding conversation that were indicative of the feedback request, or (b) a summary generated based on the one or more features. For example, a feature request extracted verbatim from a conversation can be "Could you provide an integration with an instant messaging application?," which is generated based on the feature such as usage of words "Could you provide an integration with an instant messaging application?" in the conversation. In another example, a summarized form of the feature request based on the above determined feature can be "Integration with instant messaging application." In some embodiments, the summarized feature request can be a paraphrasing or include paraphrasing of a feature request identified in the conversation. For example, a paraphrased feature request based on the above same feature can be "Customer requests integration with an instant messaging application." The summary can be generated using many techniques, e.g., rule-based technique, semantic analysis (e.g., parsing, noun chunking, part of speech tagging), artificial intelligence (AI), machine learning (ML) or NLP. The summarization can also include context of the conversation, e.g., speaker names, time, date, location, or a topic of the conversation. The context can be obtained using metadata associated with the conversation. An example of a summary of the feature request that includes speaker identification information is "VP sales of Goober Inc. requested 'select all' and 'delete all' option." The feedback manifest can also include information such as one or more of a recording ID of one or more recordings corresponding to the conversation for which the feature request is identified, a representative ID of the representative, or a customer ID of the customer involved in the conversation or any other user identified by one of the speakers during the conversation, all or some of which can be obtained from the metadata. In some embodiments, the metadata is associated with a recording when the recording is stored at the storage system. The metadata may be added to the recording automatically by the system and/or can be added or modified by the consumer user.

Similar to the feature requests, the feedback identification system can also identify a "pain point" based on the analysis of the conversations. In some embodiments, a pain point is indicative of a problem an entity is facing with a product. For example, a customer pain point associated with a software product, such as an email application, can be that a loading time for the email application is very high. A pain point is typically expressed by a customer or a prospective customer though it can be expressed by other entities in a conversation, e.g., a representative.

The feedback identification system analyzes the conversations to identify and extract pain points that are expressed either explicitly or implicitly, and include those pain points in the feedback manifest as a verbatim version from the conversation and/or a summarized version of what was expressed in the conversation. Example of a feature that can be indicative of a pain point associated with a product can include usage of words or phrases in a conversation such as "The time taken by the email application to load is frustrating," or "I'm quite unhappy with the quality of your software." Example of a feature that can be implicitly indicative of a pain point can include usage of words or phrases such as "So what did you think about the new scheduling functionality?" by one speaker in a conversation and "The truth is I'm looking into a few other solutions for that . . . " by another speaker in the conversation as features that are indicative of a pain point (e.g., customer is not happy with the new scheduling functionality).

Upon identifying a set of features in a conversation that is indicative of the pain point, the feedback identification system generates, using the set of features, information regarding the pain point, e.g., as a feedback manifest. The feedback manifest can include the pain point as a verbatim version from the conversation and/or a summarized version of what was expressed in the conversation. For example, a pain point extracted verbatim from a conversation can be "The time taken by the email application to load is frustrating," which is generated based on the feature such as usage of words "The time taken by the email application to load is frustrating" in the conversation. In another example, a summarized form of the pain point generated based on the above determined feature can be "High load time of the email application." In some embodiments, the summarized pain point can be a paraphrasing or include paraphrasing of the pain point identified in the conversation. For example, a paraphrased pain point generated based on the above same feature "The time taken by the email application to load is frustrating" can be "Time taken by the email application to load is high." The summary can be generated using many techniques, e.g., rule-based technique, semantic analysis, AI, ML or NLP.

The feedback identification can generate separate feedback manifests for different types of "product feedback", or generate a single feedback manifest that includes many types of product feedback. In some embodiments, a first type of product feedback includes information regarding a feature request and a second type of product feedback includes information regarding a pain point. Note that unless specified otherwise, "product feedback" refers to information regarding a feature request, a pain point, or both.

The feedback identification system can send the feedback manifest to a consumer user, who can use the feedback manifest for various purposes. For example, an organization can use the product feedback from the feedback manifest to minimize customer churn (e.g., losing customers and/or losing business from customers) and maximize upsell of a product (e.g., improving their business by selling a product to more customers and/or bringing more business from the existing customers). Using the feedback manifest, an organization can understand the customer pain points associated with a product and the product features that the customers would like the product to have, and can improve the product accordingly. A consumer user can be a representative, a sales manager, or a vice president of sales, or any other user who consumes information regarding the feature requests and the customer pain points.

The feedback identification system can notify the consumer user regarding the feedback manifest in various ways. For example, the feedback identification system can transmit the feedback manifest to the consumer user via an electronic mail (e-mail). In another example, the feedback identification system can notify the consumer user regarding the product feedback by generating an alert on a display of a user device associated with the consumer user. In yet another example, the feedback identification system can provide a graphical user interface (GUI) for the consumer user to view the product feedback on demand.

The feedback identification system can analyze the conversations to identify the product feedback automatically, e.g., based on a predefined schedule or after completion of a conversation, or on-demand, e.g., based on a request from the consumer user.

While the above paragraphs describe analyzing a conversation with respect to language-based features, the feedback identification system is not restricted to analyzing such language-based features to identify or determine the product feedback; the feedback identification system can use any feature that can be indicative of the product feedback. In some embodiments, the feedback identification system can determine the product feedback based on video features, such as facial expression or body language of the customer during the discussion of the deal. For example, the representative may ask "Do you like our new scheduling functionality?" to which the customer may respond with a nod of his head or other facial expression or body language that indicates that the customer does not like the new scheduling functionality, which is a customer pain point. The feedback identification system can analyze both the phrase uttered by the customer and the facial expression of the customer in determining the product feedback. The feedback identification system can be trained using AI, ML, a process-driven technique (e.g., programmed by the consumer user) or a combination to extract the features from the conversations and/or analyze the features to determine a set of features that are indicative of the product feedback.

Further, in some embodiments, as the feedback identification system is trained to process more conversations (e.g., extract and analyze the features of the conversations) using AI and ML techniques, the number of features extracted for the same conversation can vary, e.g., can be more or can be less than the features that were extracted in prior analyses. This can be because the accuracy of the feedback identification system improves with training using AI and ML techniques. For example, if the feedback identification system extracts "10" features for a conversation that are indicative of the product feedback at a given time, it can extract more than "10" features or less than "10" features for the same conversation after it is trained to analyze "50" additional conversations. That is, the feedback identification system learns of new features that are relevant to the product feedback and/or forgets old features that are not relevant to identify the product feedback anymore as the feedback identification system is trained to process more conversations. In some embodiments, the consumer user can also define whether a particular feature is indicative of the product feedback, and the feedback identification system can further learn based on the user-defined criterion, e.g., the feedback identification system can determine, using AI and ML techniques, what other similar or additional features are indicative of the product feedback.

Turning now to FIG. 1, FIG. 1 is a block diagram of a call-modeling system 100 in which the disclosed embodiments can be implemented. The call-modeling system 100 includes an offline analysis component 110 and a real-time analysis component 130. The offline analysis component 110 can take as input historical call data 105, which includes conversations between participants, e.g., audio recordings of calls between representatives and customers, and process the call data 105 using multiple components to generate features 115 of the conversations, and classifiers 120.

The offline analysis component 110 includes a feature generation component 111 that generates features 115 by analyzing the call data 105 using various techniques, e.g., ASR, NLP, AI, ML. The features 115 can include transcripts of audio recordings, vocabulary, semantic information of conversations, summarization of a call, summarizations of utterances and various natural language entailments, voice signal associated features (e.g., speech rate, speech volume, tone, and timber), emotions (e.g., fear, anger, happiness, timidity, fatigue), personality traits (e.g., trustworthiness, engagement, likeability, dominance, charisma, confidence, etc.), personal attributes (e.g., age, accent, and gender), and inter-speaker attributes that indicate a comparison between both the speakers (e.g., similarity of speech rate between the representative and the customer, extrovert/introvert matching, or gender or age agreement). Further, the features can include not only aural features, but also non-aural features, e.g., visual features such as body language of a participant, and facial expressions of the participant, or any combination of aural and non-aural features.

The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," a measure of "customer satisfaction," and Net Promoter Score (NPS). An outcome can have binary values, e.g., "yes/no", "high/low", or non-binary values, e.g., a probability score, enumerated values like "low, average, medium, high, very high," values on a scale of 0-10, etc. For example, an outcome such as customer satisfaction can be measured using binary values such as "low/high", or using non-binary values, such as a scale of 0-10, enumerated values. Each of the classifiers indicates a specific outcome, a probability of the specified outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal.

In some embodiments, the classifier component 112 generates different classifiers for different time windows of the conversations. For example, the classifier component 112 generates a classifier "C1" for the first two minutes of the conversations and a classifier "C2" for a third minute of the conversations. The classifier "C1" based on the first two minutes of the conversation can indicate that when laughter by a customer and two open-ended questions from the representative is registered, there is a high chance, e.g., 83%, of renewal. The classifier "C2" based on the third minute of the conversation can indicate that when a competitor magazine or the key-phrase "read online" is used, the renewal chances drop to 10%, all of which can occur if customer's speech rate drops below three words per second. Some of the classifiers include features for inter-speaker attributes that indicate a comparison between the speakers that contribute to a specified outcome (e.g., similarity of speech rate between the representative and the customer, extrovert/introvert matching, or gender or age agreement).

The features, when extracted from the conversations, can include attributes and values. The classifier determines what values of the features influence a particular outcome of the call. The classifiers 120 can be generated in various formats and is not limited to the above illustrated example format. The classifier component 112 can generate multiple classifiers for the same outcome; however, the multiple classifiers can have distinct sets of features. Further, as described above, the classifier component 112 can generate different classifiers for different time windows of the conversation. The offline analysis component 110 can store the features 115 and the classifiers 120 in a storage system 125.

The call-modeling system 100 includes a real-time analysis component 130 that uses the classifiers 120 to generate on-call guidance for both inbound and outbound calls that will help the representative optimize the call for a desired outcome, or optimize the call duration if the desired outcome is not predicted (i.e., very low chances of the desired outcome are predicted). The real-time analysis component 130 receives real-time call data 150 of an ongoing conversation between a customer and a representative and analyzes the real-time call data 150 to generate a set of features, e.g., call features 135, for the ongoing conversation using a feature generation component 113. In some embodiments, the feature generation component 113 is similar to or the same as the feature generation component 111. The feature generation component 113 generates the call features 135 based on the real-time call data 150, e.g., as described above with respect to the feature generation component 111. The real-time call data 150 can be an early-stage or initial conversation between the customer and the representative.

After the call features 135 are generated, a classifier component 114, which, in some embodiments, is the same as, or similar to the classifier component 112, inputs the call features 135 to the classifiers 120 to determine a set of classifiers 140 that predict possible outcomes of the call based on the call features 135. Each of the set of classifiers 140 indicates a specified outcome of the call and an associated probability of the corresponding outcome. In some embodiments, the classifier component 114 chooses classifiers that have the highest prediction power, which can be measured using an F-score, as the set of classifiers 140. After the set of classifiers 140 are determined, a call-modeling component 116 generates an on-call guidance 145 that includes real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and include those features and values associated with those features in the on-call guidance 145. The on-call guidance 145 notifies the representative to adopt, desist or persist with an on-call behavior consistent with those features to achieve the desired outcome, or to increase the probability of achieving the desired outcome. If the set of classifiers 140 predict that the desired outcome may not be achieved, the call-modeling component 116 may suggest, in the on-call guidance 145, that the representative wrap up the call.

The call data 105 can be in various formats, e.g., audio recordings, transcripts of audio recordings, online chat conversations. Similarly, the real-time call data 150 can be in various formats, e.g., real-time audio stream of the call, a chat transcript of an ongoing conversation in an online chat application. Further, the real-time call data 150, which can include an initial or early stage conversation, can be a conversation between the customer and an automated machine, e.g., an interactive voice response (IVR) system, or a representative for gathering preliminary information from the customer that can be useful for generating the on-call guidance.

In some embodiments, the call-modeling system 100 includes a search tool that empowers a consumer user to explore various aspects of a conversation. For example, the search tool allows the consumer user to search for anything that came up on the call, e.g., both linguistic and meta-linguistic. The search tool can be used to further analyze the conversation, extract appropriate features and use them to improve the classifiers in predicting the outcome of the calls. For example, the search tool can be used to find calls that registered a laughter from the customer, calls in which the customer spoke for the first time after a specified number of minutes, calls in which the customer sounded angry, calls in which customer mentioned competitors, calls in which the representatives engaged in rapport building, calls in which the representative modulated speech rates at various instances of the call, calls in which short or open-ended questions were asked at a high frequency, or any combination of the above.

Figure 2:
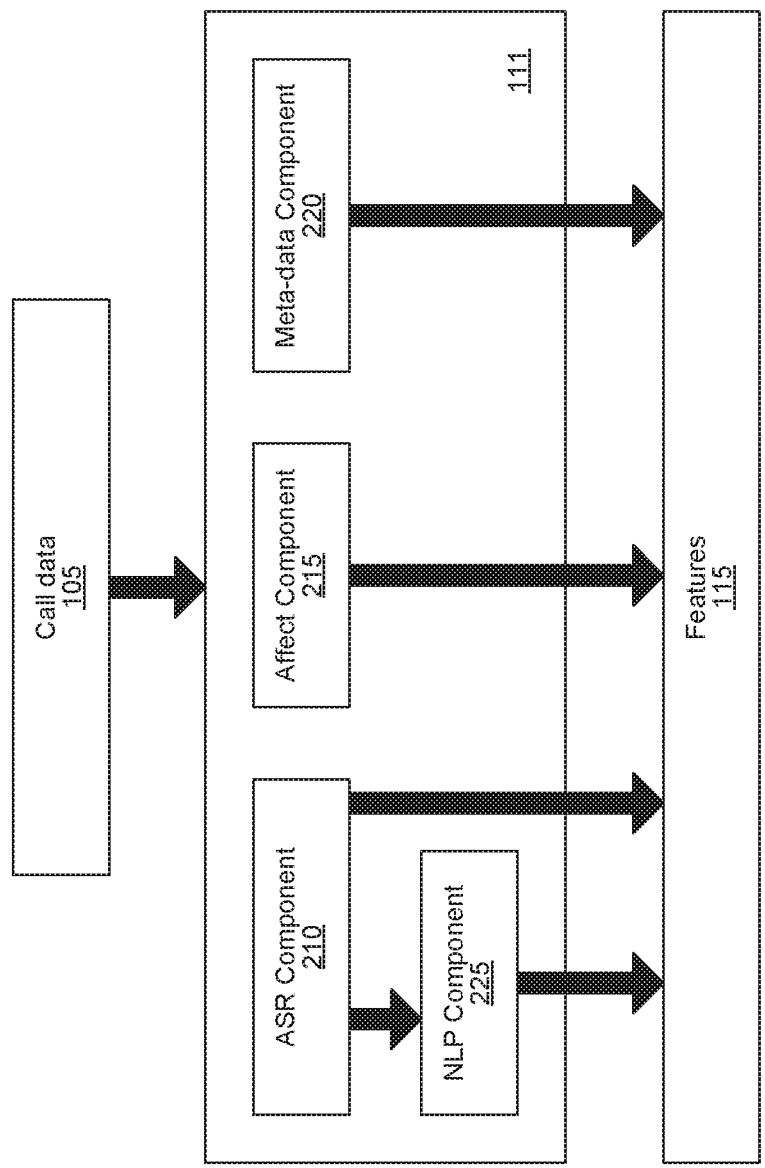
FIG. 2 is a block diagram of a feature generation component of the call-modeling system for extracting features from call data, consistent with various embodiments.

FIG. 2 is a block diagram of a feature generation component of FIG. 1 for extracting features from call data, consistent with various embodiments. In some embodiments, the feature generation component 111 includes an ASR component 210, an NLP component 225, an affect component 215 and a metadata component 220. The ASR component 210 can analyze call data 205, e.g., a voice recording, and produce a transcription, vocabulary, and a language model of the conversation. The NLP component 225 can extract semantic information, such as key objection handling responses, from the output of the ASR component 210. The affect component 215 can analyze the call data 205 for emotional signals and personality traits (e.g., likeability, extroversion/introversion, charisma, confidence, and trustworthiness) as well as general personal attributes such as gender, age, and accent of the participants. The metadata component 220 can extract data regarding conversation flow (e.g., who spoke when, and how much silence and overlap occurred). In some embodiments, the above components can process the call data 105 in parallel. The output of the components can be generated as features 115 of the conversations, which can be analyzed to determine outcomes of the conversations.

The ASR component 210 may be tuned for specific applications, e.g., for sales calls. The features produced by the ASR component 210 may include full transcripts, vocabularies, statistical language models (e.g., transition probabilities), histograms of word occurrences ("bag of words"), weighted histograms (where words are weighted according to their contextual salience, using e.g., a Term Frequency—Inverse Document Frequency (TF-IDF) scheme), n-best results, or any other data available from the component's lattice, such as phoneme time-stamps, etc. The ASR component 210 may also be used to extract meta-linguistic features such as laughter, hesitation, gasping, background noise, etc. The ASR features can be extracted separately for the representative and the customer, and may be recorded separately for multiple speakers on each side of the conversation.

The NLP component 225 processes the text to produce various semantic features, e.g., identification of topics, identification of open-ended questions, identification of objections and their correlation with specific questions, named entity recognition (NER), identification of relations between entities, identification of competitors and/or products, identification of key phrases and keywords (either predetermined, or identified using salience heuristics such as TF-IDF), etc. Additional features that may be extracted by the NLP component 225 can be summarizations of utterances and various natural language entailments. The NLP features can be extracted separately for the representative and the customer, and may be recorded separately for multiple speakers on each side of the conversation.

The affect component 215 can extract low-level features and high-level features. The low-level features can refer to the voice signal itself and can include features such as speech rate, speech volume, tone, timber, range of pitch, as well as any statistical data over such features (e.g., maximal speech rate, mean volume, duration of speech over given pitch, standard deviation of pitch range, etc.). The high-level features can refer to learned abstractions and can include identified emotions (e.g., fear, anger, happiness, timidity, fatigue, etc.) as well as perceived personality traits (e.g., trustworthiness, engagement, likeability, dominance, charisma, confidence, etc.) and perceived or absolute personal attributes such as age, accent, and gender. Emotion identification, personality trait identification, and personal attributes, may be trained independently to produce models incorporated by the affect component, or trained using the human judgment tags optionally provided to the offline analysis component. In some embodiments, the affect component 215 can also extract features, such as a speaker engagement metric ("wow" metric), which measures how engaged a participant was in the conversation, e.g., based on the usage of vocabulary, rate of speech, pitch change. For example, the usage of phrase "Oh! cool" can indicate a higher degree of engagement than the phrase "cool!". In another example, the same phrase but said in different pitches or pitch ranges can indicate different degrees of engagement. All features extracted by the affect component 215 may or may not include a corresponding confidence level, which can be used in modeling outcomes. The affect features can be extracted separately for the representative and the customer, and may be recorded separately for multiple speakers on each side of the conversation.

The metadata component 220 can measure conversation flow, including speaker diarisation (e.g., which speaker spoke when and for how long), silence times and duration, as well as overlap of two or more speakers in addition to other metadata such as time of day call was placed, geographical destination of call and known gender and age of participants. The data extracted with the metadata component 220 may be collected separately for multiple speakers on each side of the conversation, or pooled together for representative and customer sides, respectively.

All components may extract features for a group of representatives, a single representative and/or a customer, including multiple parties on either side, and may be customized to optimize feature extraction accordingly. In addition, the features 115 may be extracted on the representative's recording alone, on the customer's recording alone, or on both. The features 115 may also include comparisons between extracted attributes. For example, the affect component 215 may extract as a feature a mean difference between representative and customer's speech rates, or a maximum difference between representative and customer's speech pitches. Likewise, the ASR component 210 may extract transcriptions and keywords both as a combined transcript and as two separate transcripts, and may be tuned with an acoustic or language model specific to a group of representatives or an individual representative. Similarly, the NLP component 225 may extract features such as open-ended questions with or without the corresponding response.

In some embodiments, the feature generation component 111 can also generate a set of features that indicate a blueprint of a conversation. The blueprint can represent a skeleton of the conversation and indicate a presence or absence of a particular aspect in the conversation. For example, the blueprint can include various features that indicate whether the conversation included any agenda setting, rapport building, clarification questions, defining goals, setting expectations, mentioning of examples. The blueprint can also help in predictive analysis of the outcome of the calls, e.g., by the classifier component 112. One or more components of the feature generation component 111 can use AL and/or ML techniques to extract one or more of the features 115.

Figure 3:
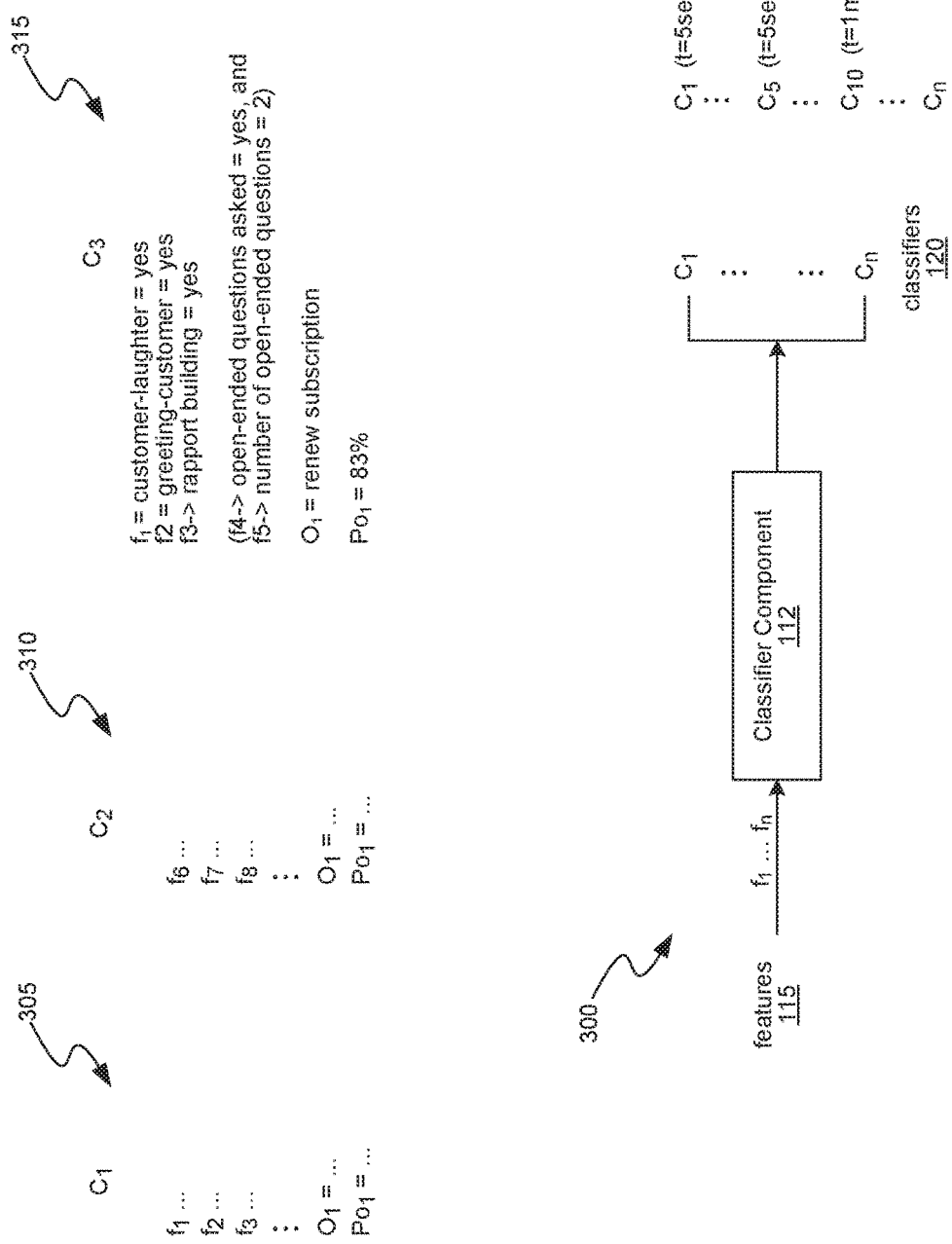
FIG. 3 is a block diagram of a classifier component of the call-modeling system for generating classifiers, consistent with various embodiments.

FIG. 3 is a block diagram of the classifier component for generating classifiers, consistent with various embodiments. The example 300 illustrates the classifier component 112 using the features 115 extracted from the feature generation component 111 to generate a number of classifiers, "C1"-"CN". In some embodiments, the classifier component 112 analyzes the features of a dedicated portion of the collected recordings, e.g., a training set, which is a subset of the entire recordings available for analysis, to generate the classifiers 120. Each of the classifiers 120 can have a value, e.g., an F-score, that indicates a prediction power of the classifier for the specified outcome. The higher the prediction power, the higher the probability of achieving the specified outcome of the classifier based on the included features. In some embodiments, the prediction power is determined by running the classifiers 120 on, e.g., a portion of call recordings that is not yet analyzed, e.g., a test set, and computing the respective F-score.

The classifiers 120 may be further analyzed to determine what features carry the largest prediction power, e.g., speech rate early in the conversation, occurrence of first interrupt by customer, names of competitors mentioned, or number of open questions thoughtfully answered, and a subset of these classifiers that have features with the largest prediction power can be used to generate the on-call guidance.

The conversation outcome depicted by the classifiers 120 can be any configurable outcome, e.g., "sales closed", "sales failed", "demo scheduled", "follow up requested," NPS-like probability of recommending to a friend, etc. In some embodiments, the features 115 extracted from the feature generation component 111 can be fed into a machine learning algorithm (e.g., a linear classifier, such as a SVM, or a non-linear algorithm, such as a DNN or one of its variants) to produce the classifiers 120. The classifiers may be further analyzed to determine what features carry the largest prediction powers (e.g., similarity of speech rate, occurrence of first interrupt by customer, extrovert/introvert matching, or gender or age agreement.)

The classifier component 112 can generate multiple classifiers for the same outcome. However, for a given outcome, different classifiers have different features. For example, the classifier component 112 can generate a first classifier 305, "C1," and a second classifier 310, "C2," for a specified outcome, "O1." However, the first classifier "C1" has a first set of features, e.g., features "f1"-"f3," and the second classifier "C2" has a second set of features, e.g., features "f5"-"f8." The features in different classifiers can have different prediction powers and contribute to the specified outcome in different degrees.

Different classifiers may be built for a different number of participants, and may consider multiple participants as a single interlocutor, or as distinct entities. Further, as described above, the classifier component 112 can generate different classifiers for different time intervals of a conversation. The classifier component 112 analyzes the features 115 extracted from the feature generation component 111 at various time intervals, e.g., seconds 00:05-00:10, seconds 00:20-00:30, minutes 1:00-2:00, covering the entire conversation duration, and generates one or more classifiers for each of those time intervals. Each classifier can correspond to a specified time interval of the conversation. For example, if "100" conversations are being analyzed, then the classifier component 112 can analyze first 5-20 seconds each of the "100" conversations and generate one or more classifiers for all the conversations corresponding to the interval of 5-20 seconds. Similarly, it can generate one or more classifiers corresponding to the 10-25 seconds interval. If more than one classifier is generated for a specified time interval, in some embodiments, different classifiers can have different outcomes, and in some embodiments, can have the same outcome; however, different classifiers will have different sets of features that contribute to the corresponding outcome. In the example 300, classifiers C1 and C5 correspond to a time window of seconds 00:05-00:20 of the conversations analyzed, and classifier C10 corresponds to minute 1:00-2:00 of the conversations.

The classifier 315, "C3," includes an example set of features extracted from analyzing various sales calls. The classifier 315 corresponds to the first two minutes of the conversations, and indicates that when laughter from the customer is registered and the representative greets the customer, indulges in rapport building and poses at least two open-ended questions, then there is a high chance, e.g., 83%, of renewal of a magazine subscription. The features and outcome of the classifier 315 "C3" can be "f1→customer laughter=yes" "f2→greeting customer=yes," "f3→rapport building=yes," ("f4→open ended questions asked=yes," and "f5→number of open ended questions asked=2"), "outcome=renew subscription" "probability of outcome=83%."

Figure 4:
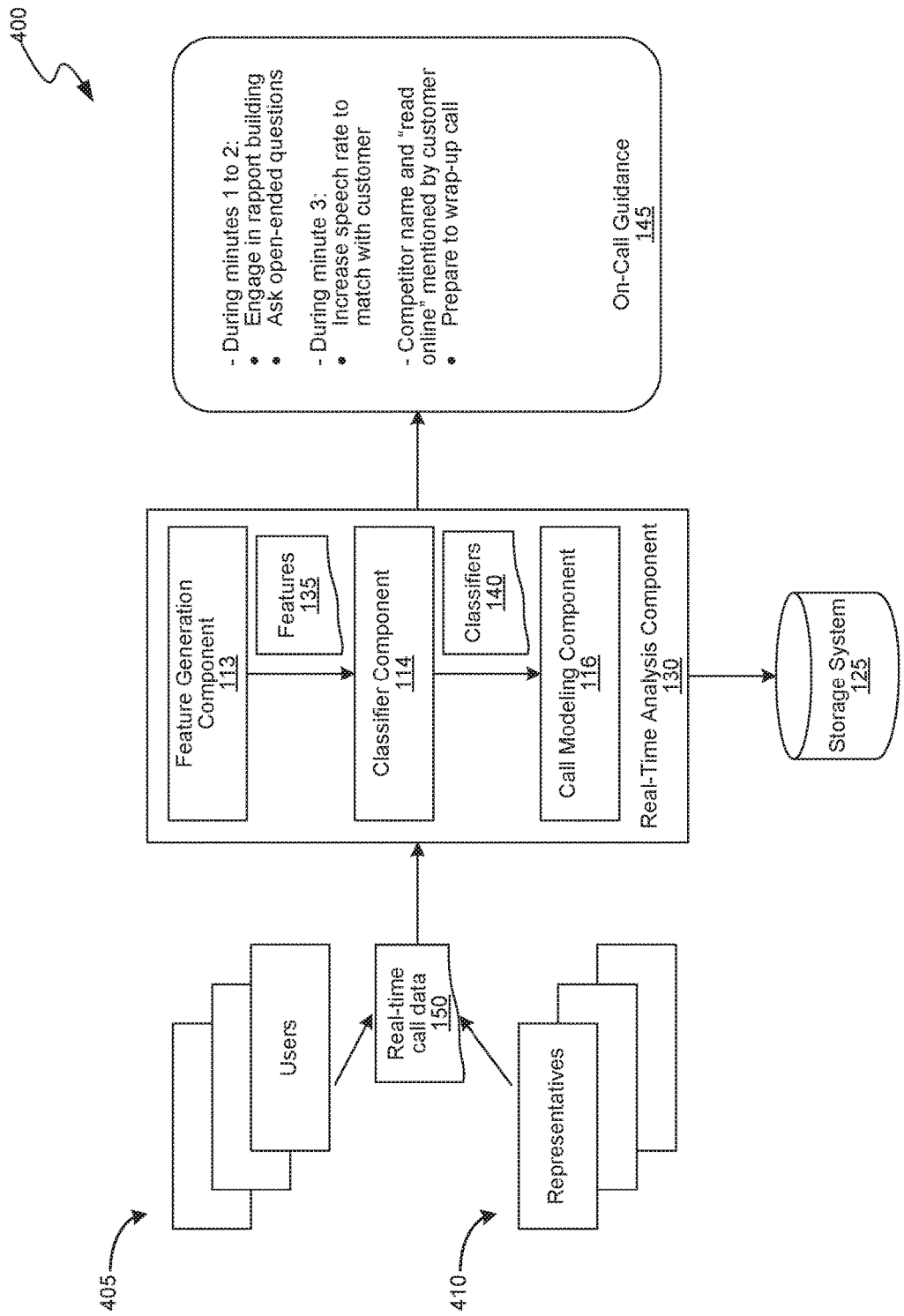
FIG. 4 is a block diagram of a real-time analysis component of the call-modeling system for generating on-call guidance for a representative during a call between the representative and a customer, consistent with various embodiments.

The classifiers 120 can be used by the real-time analysis component 130, e.g., as described at least with reference to FIG. 1 above and FIG. 4 below, to generate an on-call guidance for representatives or both inbound and outbound calls. FIG. 4 is a block diagram of the real-time analysis component of FIG. 1 for generating on-call guidance for a representative during a call between the representative and a customer, consistent with various embodiments. In some embodiments, the real-time analysis component 130 takes as input a live conversation stream, e.g., real-time call data 150, between a representative 410 and a customer 405, uses the feature generation component 113 to extract call features 135, e.g., as described above at least with reference to FIGS. 1 and 3.

The classifier component 114 feeds the call features 135 into the classifiers 120 generated by the offline analysis component 110 and selects a subset of the classifiers 120, e.g., a set of classifiers 140, that includes features that match with the call features 135 extracted from the live conversation stream. In some embodiments, the set of classifiers 140 chosen by the call-modeling component 116 are also the classifiers that have high predictability power, e.g., as measured using an F-score and that have an F-score exceeding a specified threshold.

The call-modeling component 116 then generates an on-call guidance 145, which includes information regarding real-time probabilities for specific outcomes to which the set of classifiers 140 correspond. The on-call guidance 145 may be used to notify the representative and/or their managers of the predicted outcome of the call. Additionally, the call-modeling component 116 can further analyze the set of classifiers 140 to determine classifiers that include features with the largest prediction powers, and present the values of those features in the on-call guidance 145 for suggesting the representative and/or their managers to modify or persist with an on-call behavior consistent with those features. For example, if one of the set of classifiers 140 predicts that conversations with rapport building and several open-ended questions being posed at the first few minutes of the conversation lead to favorable outcomes, the call-modeling component 116 may notify the representative and/or their managers as part of the on-call guidance 145 to engage in rapport building and pose questions at early stages of the conversation. Similarly, if one of the classifiers from the set of classifiers 140 indicates that matching speech rate to within 10% of customer's rate at a specified relative position of the call, e.g., during third minute of the call, leads to improved closing results, the call-modeling component 116 may notify the representative and/or their managers as part of the on-call guidance 145 to adjust their speech rate accordingly. On the other hand, if one of the classifiers from the set of classifiers 140 indicates that conversations beginning with over a specified number of objections, naming a specific competitor and mention of the phrase "read online" do not lead to good results, the call-modeling component 116 may notify the representative and/or their managers as part of the on-call guidance 145 to expedite wrap-up of conversations to avoid losing time on a call that is not likely to yield desired results.

In addition to live on-call guidance, the real-time analysis component 130 may be used to provide the representative and/or their managers with non-real time analysis as well, which provides insight into details of the conversations, e.g., what occurred in the conversations, when events occurred, and various such quantifiable analytics of the calls. For example, the classifiers can be used to find interesting calls that would interest the representatives to listen and learn from. The disclosed embodiments can be used to improve outcomes of the call not only during a real-time or a live call, but could also be used to inform representatives and/or managers for better training and coaching in retrospect.

The real-time analysis component 130 may also be used to auto-populate information fields in a customer relationship management (CRM) system or a similar system.

Figure 5:
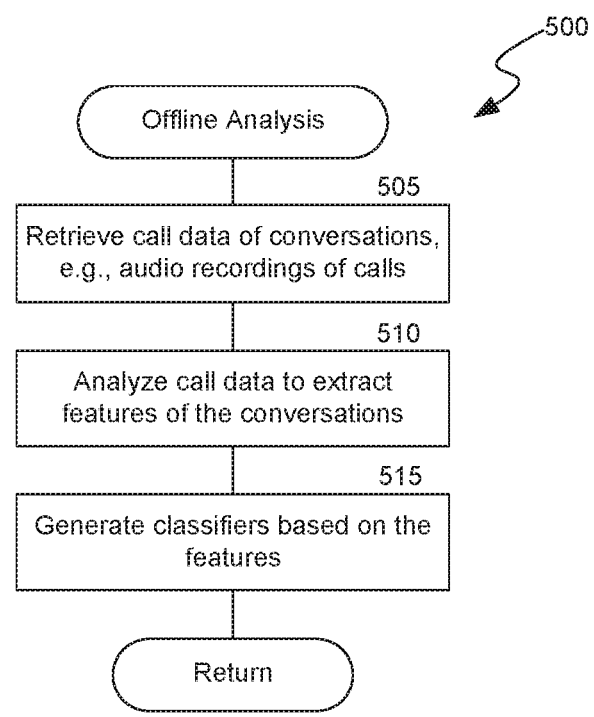
FIG. 5 is a flow diagram of a process for performing offline analysis of conversations between participants, consistent with various embodiments.

FIG. 5 is a flow diagram of a process 500 for performing offline analysis of conversations between participants, consistent with various embodiments. In some embodiments, the process 500 can be implemented in the call-modeling system 100 of FIG. 1. At block 505, the offline analysis component 110 retrieves historical call data, e.g., call data 105, regarding various conversations between participants, such as a customer and a representative. In some embodiments, the call data 105 can be audio recordings of calls between the participants, transcripts of audio recordings, chat transcripts, etc. The offline analysis component 110 can retrieve the call data 105 from the storage system 125. Further, in some embodiments, the call data 105 can include data regarding only a subset of the conversations stored in the storage system 125.

At block 510, the feature generation component 111 analyzes the call data 105 to extract various features of the conversation, e.g., as described at least with reference to FIGS. 1 and 2. Some example features include transcripts of audio recordings, vocabulary, semantic information of conversations, summarizations of utterances and various natural language entailments, voice signal associated features (e.g., speech rate, speech volume, tone, and timber), emotions (e.g., fear, anger, happiness, timidity, fatigue), inter-speaker features (e.g., similarity of speech rate between speakers, occurrence of first interrupt by customer, extrovert/introvert matching, or gender or age agreement), personality traits (e.g., trustworthiness, engagement, likeability, dominance, charisma, confidence, etc.) and personal attributes (e.g., age, accent, and gender). The feature generation component 111 can also analyze the call data 105 to generate various tags as described above.

At block 515, the classifier component 112 analyzes the features to generate classifiers, e.g., as described at least with reference to FIGS. 1 and 3. The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," NPS, or customer satisfaction. Each of the classifiers indicates a specific outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal. The classifier component 112 can generate multiple classifiers for the same outcome; however, they have distinct sets of features. Further, the classifier component 112 generates different classifiers for different time windows of the conversations. For example, the classifier component 112 generates a classifier "C1" for first two minutes of the conversations and a classifier "C2" for a third minute of the conversations. The offline analysis component 110 can store the features 115 and the classifiers 120 in a storage system 125.

Figure 6:
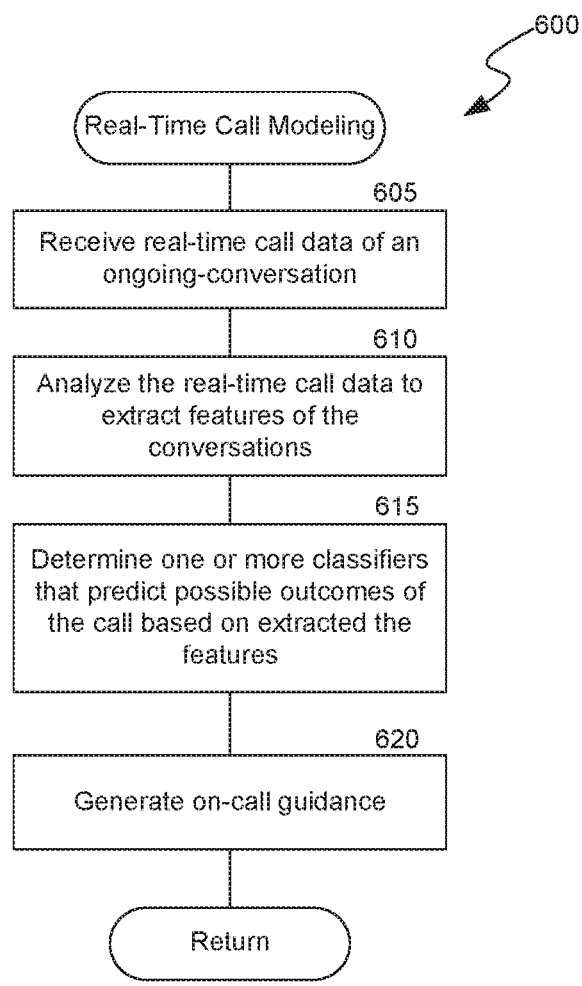
FIG. 6 is a flow diagram of a process for modeling calls between the participants to generate on-call guidance, consistent with various embodiments.

FIG. 6 is a flow diagram of a process 600 for modeling calls between participants to generate on-call guidance, consistent with various embodiments. In some embodiments, the process 600 can be implemented in the call-modeling system 100 of FIG. 1. At block 605, the real-time analysis component 130 receives real-time call data 150 of an ongoing conversation, e.g., an audio stream of a voice call between a customer and a representative. At block 610, the feature generation component 113 analyzes the real-time call data 150 to extract features, e.g., call features 135, of the ongoing conversation, e.g., as described at least with reference to FIGS. 1 and 2. The feature generation component 113 can also analyze the real-time call data 150 to generate various tags as described above.

At block 615, the classifier component 114 inputs the extracted features to classifiers in the storage system, e.g., classifiers 120 which are generated as described at least with reference to process 500 of FIG. 5, to determine one or more classifiers that predict possible outcomes of the call based on the extracted features. For example, as described at least with reference to FIGS. 1 and 4, the classifier component 114 feeds the extracted features 135 into the classifiers 120 generated by the offline analysis component 110, and selects a subset of the classifiers 120, e.g., a set of classifiers 140, that includes features that match with the call features 135 extracted from the live conversation stream. In some embodiments, the set of classifiers 140 include classifiers whose prediction power exceeds a specified threshold. The set of classifiers 140 corresponds to specific outcomes and include real-time probabilities for the specific outcomes.

At block 620, the call-modeling component 116 generates on-call guidance, e.g., on-call guidance 145, that presents the real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and then include those features and values associated with those features in the on-call guidance 145. The on-call guidance 145 notifies the representative to adopt or persist with an on-call behavior consistent with those features to achieve the desired outcome, or at least to increase the probability of achieving the desired outcome. For example, the on-call guidance 145 can present instructions on a display screen of a user device associated with the representative recommending the representative to change the rate of speech, use specific key words, or pose more open-ended questions to the customer in order to increase the probability of achieving the desired outcome.

Example Usage of the Embodiments

The following is an example usage of the disclosed embodiments for modeling sales calls for renewal of a subscription for a magazine. At a first stage, e.g., before a call is received from a live customer or before a call is placed by a representative, a number of recordings of previous calls is processed by the offline analysis component 110, e.g., using an ASR component 210 that is customized for the field of surgery institutions, an NLP component 225, an affect component 215 and a metadata component 220 to generate various features. The classifier component 112 generates two classifiers, based on those features, that can be found to be highly predictive: (a) a first classifier based on the first two minutes of one or more of the analyzed conversations, which indicates that when a laughter by the customer is registered, the representative engages in rapport building, and at least two open-ended questions are posed by the representative, then there is a high chance, e.g., 83%, of subscription renewal; (b) a second classifier based on the third minute of one or more of the analyzed conversations, which indicates that when a competitor magazine or the key-phrase "read online" is used, and/or the speech rate of the customer is more than three words per second, the renewal chances drop to 10%.

The above two classifiers can then be used by the real-time analysis component 130 in a second stage, e.g., during a live call between the representative and the customer, for generating an on-call guidance to guide the sales representatives as follows. Based on the first classifier, the real-time analysis component 130 can indicate to the sales representative to ask questions within the first 2 minutes. Based on the second classifier, the real-time analysis component 130 can, at minute three of the conversation, urge the representative to reduce speech rate to get the customer to mirror their own speech rate if a competitor is mentioned or otherwise the phrase "read online" is used. If the speech rate is not reduced, the real-time analysis component 130 can indicate to the representative and/or their managers to wrap up the call as soon as possible.

The embodiments disclosed above may be implemented as separate modules, e.g., as presented above, as a single module, or any combination thereof. Implementation details may vary, including core machine learning algorithms employed. The embodiments may be implemented using any software development environment or computer language. The embodiments may be provided as a packaged software product, a web-service, an API or any other means of software service. The embodiments may use expert taggers, crowdsourcing or a hybrid approach for tagging.

Figure 7:
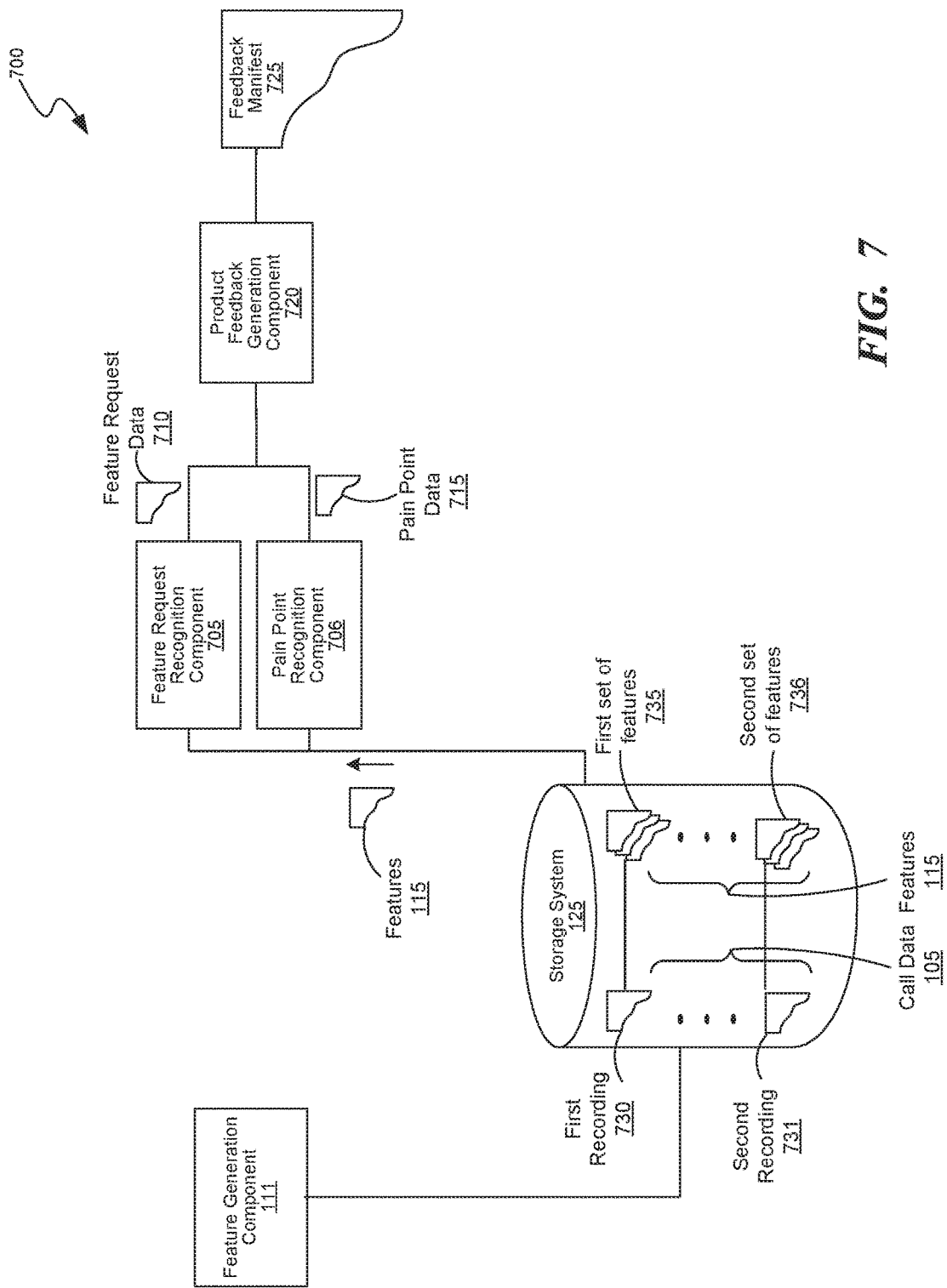
FIG. 7 is a block diagram of a feedback identification system, consistent with various embodiments.

FIG. 7 is a block diagram of a feedback identification system, consistent with various embodiments. The feedback identification system 700 can analyze the call data 105 to determine the product feedback, e.g., feature requests and/or pain points, resulting from one or more of the conversations, and generate information regarding the product feedback in a feedback manifest 725. A consumer user can use the feedback manifest 725 for various purposes, e.g., as described above.

The feedback identification system 700 includes a feature generation component, such as feature generation component 111 of FIG. 1, that generates features 115 of the conversations by analyzing the call data 105 stored in the storage system 125. The call data 105 can include many recordings, such as a first recording 730 of a first conversation between a first representative and a first customer of the organization, and a second recording 731 of a second conversation between a second representative and a second customer. The feature generation component 111 analyzes the first recording 730 to extract the first set of features 735 of the first conversation and the second recording 731 to extract the second set of features 736 of the second conversation. In some embodiments, the first set of features 735 and the second set of features 736 are a subset of the features 115. Note that the first representative can have multiple conversations with the first customer, e.g., to discuss a product being offered or sold, and can have conversations with different customers, e.g., to discuss the same product or different products, and therefore, different conversations of the first representative can have different product feedback. In some embodiments, a recording can be tagged with metadata, such as the representative ID, the customer ID, a product ID of the product being discussed in the conversation, all or some of which can identify the context of the conversation. Note that the recordings can be of a conversation that is any of telephone based, VoIP based, video conference based, VR based, AR based, e-mail based, or in-person interaction based.

The first set of features 735 can include transcripts of the conversations, vocabulary, semantic information of conversations, summarization of a call, summarizations of utterances and various natural language entailments, voice signal associated features (e.g., speech rate, speech volume, tone, and timber), detected emotions (e.g., fear, anger, happiness, timidity, fatigue, laughter), detected personality traits (e.g., trustworthiness, engagement, likeability, dominance, charisma, confidence, etc.), personal attributes (e.g., age, accent, and gender), and inter-speaker attributes that indicate a comparison between both the participants (e.g., similarity of speech rate between the representative and the customer, extrovert/introvert matching, or gender or age agreement). The first set of features 735 can include usage of words or phrases features such as a specific word, phrase, and pronouns. The first set of features 735 can also include any of length of utterances and/or turns taken by a participant in talking during the conversation, talk-to-listen ratio of a representative or a customer, or any other behavioral feature of the customer. The first set of features 735 can be features associated with the first customer, the first representative, the conversation, or a combination. The first set of features 735 can also include information that indicates with which participant a particular feature is associated.

Further, the first set of features 735 can include not only aural features, but also non-aural features, e.g., visual features such as body language of a participant, and facial expressions of the participant, or any combination of aural and non-aural features. One or more features from the first set of features 735 could also be generated from the transcripts of any of emails, online messages, and online meetings. In some embodiments, the feature generation component 111 can determine that any of a word, a phrase, a text, emoji, symbols, or a combination thereof can convey a particular feature. For example, the feature generation component 111 can determine that a text such as "Ha Ha" or "rofl" in the transcript can indicate laughter. In some embodiments, the second set of features 736 includes features similar to the first set of features 735.

In analyzing the first set of features 735 to determine if the first conversation includes any feature requests, the feature request recognition component 705 determines if any of the first set of features 735 satisfies the criterion for being indicative of a feature request. In some embodiments, the criterion can be specified by the consumer user, and/or learnt by the feature request recognition component 705, e.g., using AI and ML techniques, based on the criteria defined by the consumer user. For example, if the features based on which a feature request is to be identified are usage of words or phrases in the first conversation, then the criteria for the words or phrases to be indicative of the feature request can be defined by the consumer user, and/or the feature request recognition component 705 can be trained using AI, ML, a process-driven technique (e.g., programmed by the consumer user) or a combination to recognize the words or phrases that are indicative of the feature request based on the user-defined criteria. The feature request recognition component 705 can analyze the first set of features 735 that correspond to the usage of words or phrases in the first conversation and identify words or phrases such as "Could you provide an integration with an instant messaging application?", "I would like to see an export to spreadsheet option", or "the product should have a 'select all' and 'delete all' option" as the features that are indicative of a feature request. In some embodiments, the feature request recognition component 705 can also identify words or phrases that are implicitly indicative of a feature request, i.e., where the feature request is not explicitly stated by the speaker. For example, phrases such as:

Speaker 1: "Are you using our new charts?"
Speaker 2: " . . . Yes! Love them! We've actually hired a data scientist to create a linear regression that predicts churn from your charts" can be determined to be indicative of a feature request (e.g., for creating a linear regression that predicts a customer churn). In another example, a phrase such as "Another product in the market has those functionalities" (where "those" refers to something previously stated in the conversation) can be identified as features that are indicative of a feature request.

The feature request recognition component 705 is not restricted to the above conversational language-based features for determining features that are indicative of a feature request. The feature request recognition component 705 can use any feature associated with the first conversation that can be indicative of the feature request. In some embodiments, the feature request recognition component 705 determines the feature requests based on video features, such as facial expression or body language of the customer during the discussion of the deal; based on voice signal associated features of the customer, emotions of the customer, personality traits of the customer, or talk-listen ratio of the customer. For example, the first representative may ask "Would you like a scheduling functionality in the product?" to which the customer may respond with a nod of his head or other facial expression or body language that indicates that the customer would like to have the scheduling functionality. The feature request recognition component 705 can analyze both the phrase uttered by the customer and the facial expression of the customer in determining the feature request.

The feature request recognition component 705 can use AI, ML, a process-driven technique, or a combination to identify the features (e.g., the above features, other such similar features or additional features) that are indicative of the feature request.

Upon determining the features that are indicative of a feature request associated with the first conversation, the feature request recognition component 705 can generate the feature request data 710, which includes one or more features that are indicative of the feature request, such as one or more words or phrases in the first conversation that are determined to be indicative of the feature request.

The product feedback generation component 720 analyzes the features in the feature request data 710 and generates the feature requests for the first conversation in the feedback manifest 725. The product feedback generation component 720 can generate the feature requests verbatim from what is discussed in the first conversation, or generate a summary of the identified feature requests. Examples of various forms of feature requests generated in the feedback manifest 725 are described at least in association with FIG. 9.

The feature request recognition component 705 can analyze a single recording or multiple recordings in the storage system 125, and generate feature request data 710 for one or more of those conversations. The feature request recognition component 705 can generate separate feature request data objects for each of the conversations, or generate a single feature request data object that includes features indicative of feature requests identified across (a) multiple conversations of a representative with one or more customers, (b) multiple conversations of a representative-customer pair, (c) multiple conversations between any of multiple representatives and multiple customers, (d) multiple conversations corresponding to a specified product, or a combination of the above. If the feature request data 710 includes features indicative of feature requests across many conversations, the product feedback generation component 720 generates the feedback manifest 725 having feature requests identified across multiple conversations.

Like the feature request recognition component 705 extracts the feature requests from the conversations, a pain point recognition component 706 extracts pain points from the conversations. The pain point recognition component 706 analyzes the conversations to identify and extract pain points that are expressed either explicitly or implicitly, and include the pain points in the feedback manifest 725 as a verbatim version from the conversations and/or a summarized version of what was expressed in the conversations. The pain point recognition component 706 can analyze the first set of features 735 that correspond to the usage of words or phrases in the first conversation and identify words or phrases such as "The time taken by email application to load is frustrating," "I'm quite unhappy with the quality of your software", or "the behavior of the printing functionality is inconsistent" as the features that are indicative of a pain point. In some embodiments, the pain point recognition component 706 can also identify words or phrases that are implicitly indicative of a pain point, i.e., where the pain point is not explicitly stated by the speaker. For example, phrases such as:

Speaker 1: "So what did you think about the new scheduling functionality?"

Speaker 2: " . . . The truth is I'm looking into a few other solutions for that . . . " can be determined to be indicative of a pain point.

The pain point recognition component 706 is not restricted to the above conversational language-based features for determining features that are indicative of a pain point. The pain point recognition component 706 can use any feature associated with the first conversation that can be indicative of the pain point. In some embodiments, the pain point recognition component 706 determines the pain points based on video features, voice signal associated features of the customer, emotions of the customer, personality traits of the customer, or talk-listen ratio of the customer (examples of all of which are mentioned above). For example, the first representative may ask "Do you like our new scheduling functionality?" to which the customer may respond with a nod of his head or other facial expression or body language that indicates that the customer does not like the new scheduling functionality, which is identified as a pain point. The pain point recognition component 706 can analyze both the phrase uttered by the customer and the facial expression of the customer in determining the pain point.

The pain point recognition component 706 can use AI, ML, a process-driven technique or a combination to identify the features (e.g., the above features, other such similar features or additional features) that are indicative of the pain point.

Upon determining the features that are indicative of a pain point associated with the first conversation, the pain point recognition component 706 can generate pain point data 715, which includes one or more features that are indicative of the pain point, e.g., one or more words or phrases in the first conversation that are determined to be indicative of the pain point.

The product feedback generation component 720 analyzes the features in the pain point data 715 to generate the feedback manifest 725, which includes information regarding the pain points identified in the first conversation. The product feedback generation component 720 can generate the pain points verbatim from what is discussed in the first conversation, or generate a summary of the identified pain points in the feedback manifest 725. Examples of various forms of pain points generated in the feedback manifest 725 are described at least in association with FIG. 9.

The pain point recognition component 706 can analyze multiple recordings in the storage system 125, and generate pain point data 715 for one or more of those conversations. The pain point recognition component 706 can generate separate pain point data objects for each of the conversations, or generate a single pain point data object that includes features indicative of pain points identified across many conversations.

The product feedback generation component 720 can generate separate feedback manifests for feature requests and pain points, or generate a single feedback manifest that includes both feature requests and pain points for the product. Further, in some embodiments, the product feedback generation component 720 can generate a feedback manifest for only the feature requests but not for the pain points, or vice versa.

Figure 8:
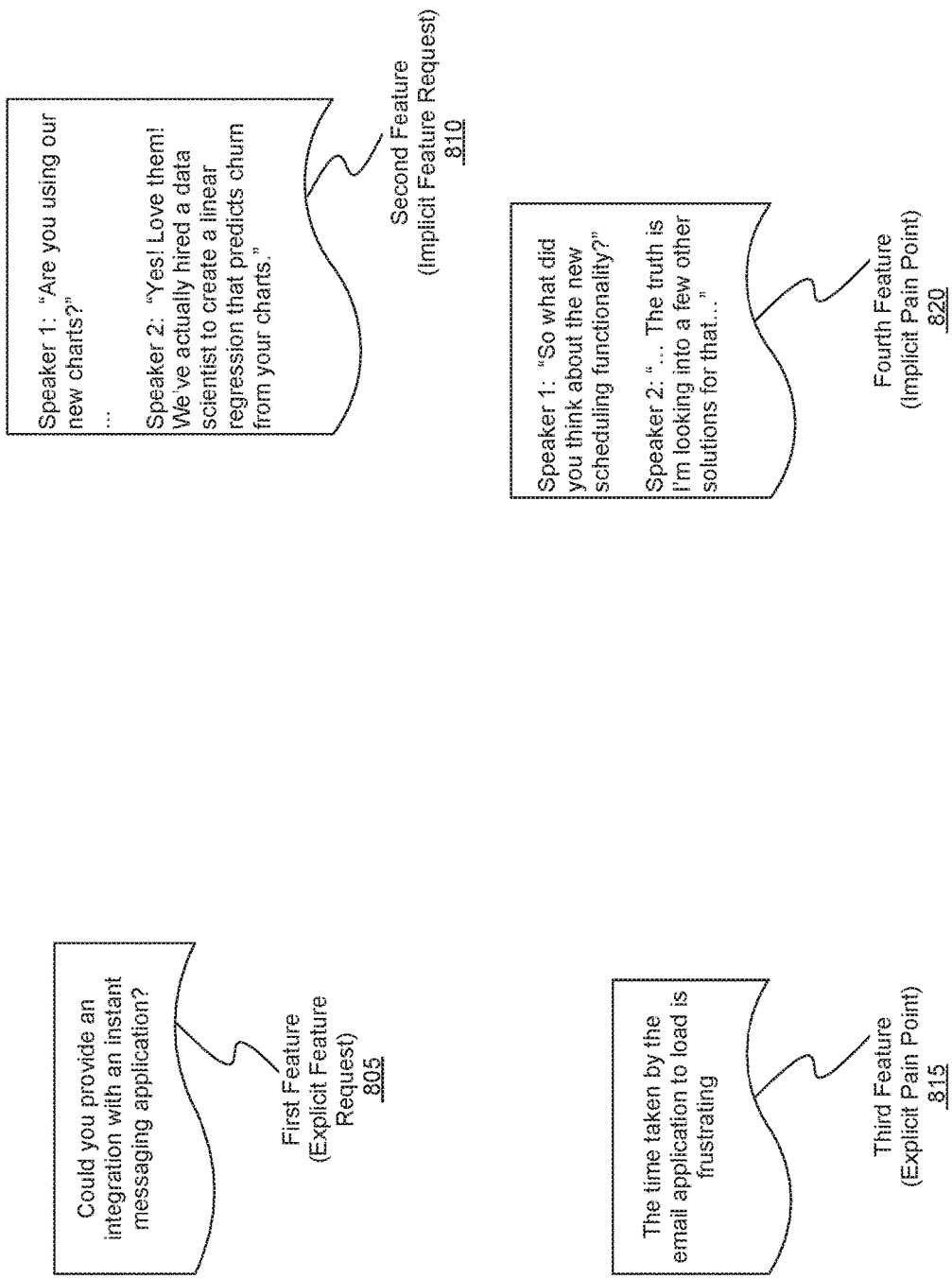
FIG. 8 is an example of feature request data and pain request data having features that are indicative of a feature request and pain point, respectively, consistent with various embodiments.

FIG. 8 is an example 800 of feature request data and pain point request data having features that are indicative of a feature request and pain point, respectively, consistent with various embodiments. As described above at least with reference to FIG. 7, the feature request recognition component 705 analyzes the first conversation to identify the features that are indicative of a feature request, and includes them in the feature request data 710. The features included in the feature request data 710 can be indicative of the feature request that are expressed in the first conversation explicitly or implicitly. For example, the feature request recognition component 705 identifies a first feature 805—"Could you provide an integration with an instant messaging application?" in the first conversation as a feature that is indicative of a feature request, which is expressed explicitly in the first conversation. The feature request recognition component 705 then includes the first feature 805 in the feature request data 710. The product feedback generation component 720 can then analyze the feature rest data 710 to generate information regarding the feature request, e.g., verbatim or summarized version of the first feature 805, in the feedback manifest 725, e.g., as described at least with reference to FIG. 9.

In another example, the feature request recognition component 705 analyzes the first conversation to identify a second feature 810—"Speaker 1: 'Are you using our new charts?' and Speaker 2: 'Yes! Love them! We've actually hired a data scientist to create a linear regression that predicts churn from your charts'" that is indicative of a feature request (e.g., for creating a linear regression that predicts a customer churn), which is expressed implicitly. The feature request recognition component 705 then includes the second feature 810 in the feature request data 710. In some embodiments, the features that are indicative of a feature request implicitly may not provide context associated with the feature request if the feature request is included in the feedback manifest 725 verbatim. Accordingly, the product feedback generation component 720 generates the feature request by summarizing the second feature 810, e.g., to "Functionality to analyze sales data charts to predict customer churn." For summarizing a feature, the feature request recognition component 705 may have to analyze a conversation prior to and/or after the feature occurred in the conversation to obtain the context. For example, to summarize "new charts" or "your charts" in the second feature 810 to "sales data charts," the feature request recognition component 705 may have to analyze the first conversation prior to and/or after the feature "Are you using our new charts?" occurs in the first conversation to identify a portion of the first conversation (not illustrated) having information regarding the feature "new charts" and include the portion in the feature request data 710 as part of the second feature 810. The product feedback generation component 720 can obtain the context for "sales data charts" using the included portion of the first conversation. The product feedback generation component 720 can generate the summary using techniques described at least with reference to FIG. 9.

The pain point recognition component 706 identifies the features of the first conversation that are indicative of a pain point and includes them in the pain point data 715. The features included in the pain point data 715 can be indicative of the pain points explicitly or implicitly. For example, the pain point recognition component 706 identifies a third feature 815—"The time taken by the email application to load is frustrating" in the first conversation as a feature that is indicative of a pain point explicitly, and includes the third feature 815 in the pain point data 715. The product feedback generation component 720 can generate the pain point corresponding to the third feature 815 verbatim or summarize the third feature 815, e.g., as described at least with reference to FIG. 9.

In another example, the pain point recognition component 706 identifies a fourth feature 820—"Speaker 1: 'So what did you think about the new scheduling functionality?' and Speaker 2: 'The truth is I'm looking into a few other solutions for that . . . '" in the first conversation as a feature that is indicative of a pain point implicitly (e.g., for creating a linear regression that predicts a customer churn). The pain point recognition component 706 includes the fourth feature 820 in the pain point data 715.

Figure 9:
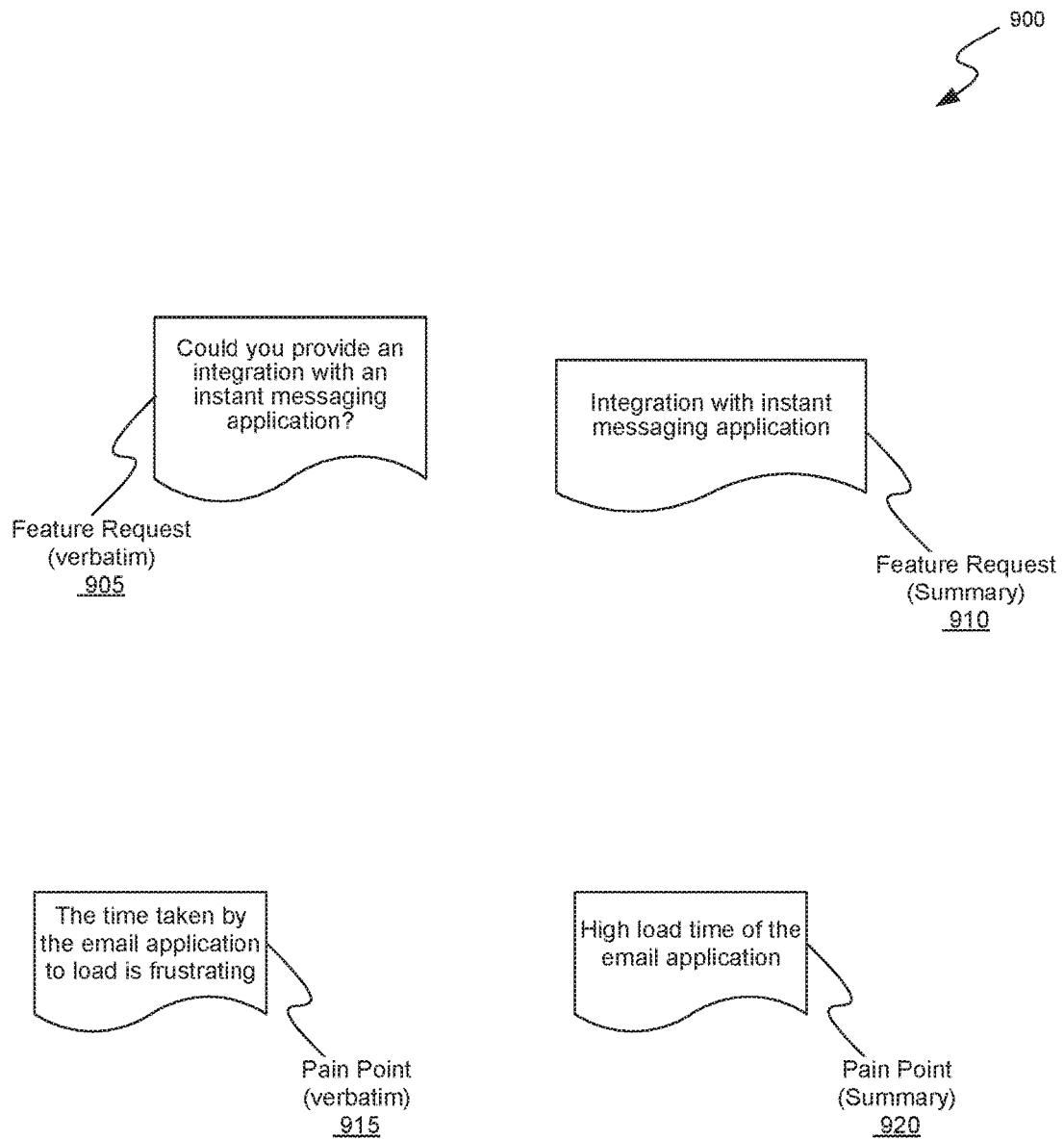
FIG. 9 illustrates various examples of feature requests and pain points extracted by the feedback identification system into a feedback manifest, consistent with various embodiments.

FIG. 9 illustrates various examples 900 of feature requests and pain points extracted by the feedback identification system into a feedback manifest, consistent with various embodiments. The product feedback generation component 720 can generate a feature request verbatim, e.g., using the same words or phrases from the first conversation that were determined to be indicative of the feature request. For example, if the feature request data 710 has a feature, such as the first feature 805 of FIG. 8 that corresponds to the usage of words or phrases in the first conversation—"Could you provide an integration with an instant messaging application?" as indicative of a feature request, the product feedback generation component 720 can generate a first feature request 905 (in the feedback manifest 725) as "Could you provide an integration with an instant messaging application?," which is verbatim from the first conversation.

In some embodiments, the product feedback generation component 720 generates a summary of the feature request in the feedback manifest 725 based on the features in the feature request data 710. Continuing with the above example of the feature request data 710 having the first feature 805 as indicative of a feature request, the product feedback generation component 720 can generate a summarized feature request 910 (in the feedback manifest 725) as "Integration with instant messaging application." The summary can be generated using any of multiple techniques, e.g., rule-based technique, semantic analysis (e.g., parsing, noun chunking, part of speech tagging), AI, ML or NLP. In some embodiments, the summarization can also include context of the first conversation, e.g., speaker names, time, date, location, or a topic of the first conversation. The context can be obtained using metadata associated with the first conversation. For example, the product feedback generation component 720 can generate the summarized feature request 910 that includes speaker identification information (not illustrated) as "VP of Sales of Goober Inc. requested integration with instant messaging application," where "VP of Sales" is the first customer associated with the first conversation.

Similar to the feature requests, the product feedback generation component 720 can also generate pain points in the feedback manifest 725 based on the pain point data 715. For example, if the pain point data 715 has a feature, such as the third feature 815 that corresponds to the usage of words or phrases in the first conversation—"The time taken by the email application to load is frustrating" as indicative of the pain point, the product feedback generation component 720 can generate a first pain point 915 (in the feedback manifest 725) as "The time taken by the email application to load is frustrating," which is verbatim from the first conversation. In some embodiments, the product feedback generation component 720 summarizes the pain point in the feedback manifest 725. Continuing with the above example of the pain point data 715 having the third feature 815 as a feature indicative of a pain point, the product feedback generation component 720 can generate a summarized pain point 920 (in the feedback manifest 725) as "High load time of the email application."

A feature request and a pain point in the feedback manifest 725 can be associated with an entity, e.g., the customer. The feedback manifest 725 can identify which product feedback is associated with which customer. Further, the product feedback generation component 720 can be configured to generate one or more feedback manifests based on user-defined criteria. For example, the product feedback generation component 720 can be configured to generate one feedback manifest 725 per product, which includes all types of product feedback provided by multiple customers for the corresponding product. In another example, the product feedback generation component 720 can be configured to generate one feedback manifest 725 per customer, which includes all types of product feedback provided by the corresponding customer for one or more products. In another example, the product feedback generation component 720 can generate a feedback manifest 725 for a single conversation, multiple conversations of a representative, multiple conversations of a representative-customer pair, or multiple conversations of a representative-customer-product triplet. Furthermore, the product feedback generation component 720 can generate a single feedback manifest 725 for both the feature requests and the pain points, or separate feedback manifests, e.g., one each for the feature requests and the pain points.

Figure 10:
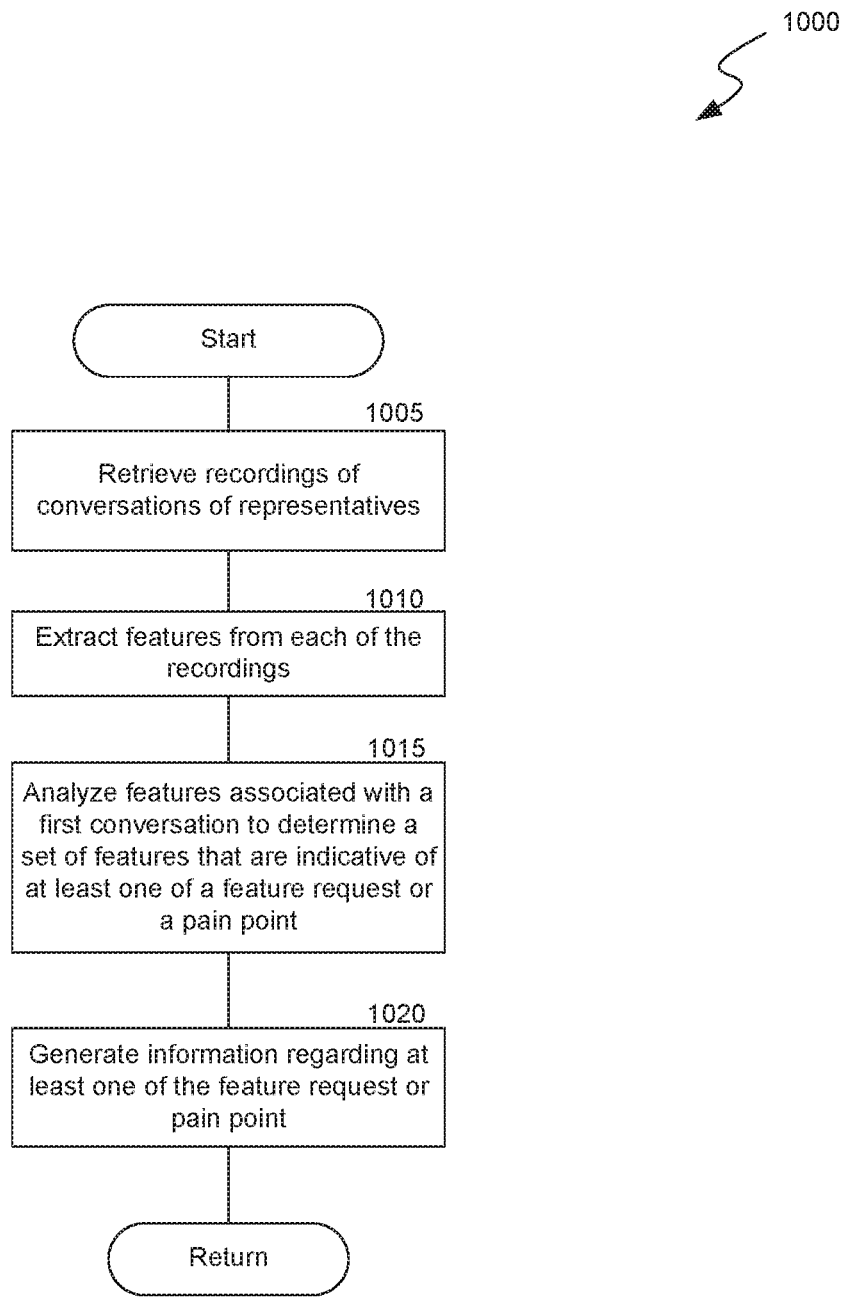
FIG. 10 is a flow diagram of a process for determining feature requests and/or pain points by analyzing conversations of representatives, consistent with various embodiments.

FIG. 10 is a flow diagram of a process 1000 for determining feature requests and/or pain points by analyzing conversations of representatives, consistent with various embodiments. In some embodiments, the process 1000 can be implemented using the feedback identification system 700 of FIG. 7. At block 1005, the feature generation component 110 retrieves recordings of conversations of representatives, e.g., a first recording 730 and a second recording 731. Each of the recordings is of a conversation between at least one of the representatives and one of the customers of an organization.

At block 1010, the feature generation component 111 extracts features from the recordings, e.g., the first set of features 735 corresponding to the first recording 730 and the second set of features 736 corresponding to the second recording. The first set of features 735 can indicate characteristics of any of (a) a first customer in the first conversation, (b) a first representative in the first conversation, and/or (c) the first conversation. Similarly, the second set of features 736 can indicate characteristics of any of (a) a second customer in a second conversation, (b) a second representative in the second conversation, or (c) the second conversation.

At block 1015, the feature request recognition component 705 analyzes the features of each of the conversations to determine a set of features that is indicative of a feature request associated with the corresponding conversation, e.g., as described at least with reference to FIG. 7. For example, the feature request recognition component 705 can be configured to identify words or phrases in the conversation such as "Could you provide an integration with an instant messaging application?", "I would like to see an export to spreadsheet option", or "the product should have a 'select all' and 'delete all' option", as a set of features that is indicative of a feature request. The feature request recognition component 705 can determine the set of features that are explicitly or implicitly indicative of a feature request. The feature request recognition component 705 stores the set of features in a feature request data object 710.

Similarly, the pain point recognition component 706 analyzes the features of each of the conversations to determine features that are indicative of pain points, and stores them in a pain point data object 715. For example, the pain point recognition component 706 can be configured to identify words or phrases in the conversation such as "The time taken by the email application to load is frustrating," or "I'm quite unhappy with the quality of your software" as indicative of a pain point associated with a product. Additional details with respect to generating the feature request data and the pain point data are described at least with reference to FIGS. 7-9. It should be noted that the feedback identification system 700 can determine one or both feature requests and pain points.

At block 1020, the product feedback generation component 720 analyzes the features in the feature request data 710 and the features in the pain point data 715 to generate a feedback manifest 725 that includes information regarding at least one of the feature requests or pain points, e.g., as described at least with reference to FIGS. 7-9. The product feedback generation component 720 can generate the feature requests and/or the pain points in the feedback manifest 725 verbatim from what is expressed in the conversations, or generate a summary of the identified feature requests and/or the pain points.

Further, while the feedback identification system 700 can be used to analyze recordings of calls (e.g., offline mode) as described above, the feedback identification system 700 can also be used to analyze a real-time call or an ongoing call (e.g., online mode) between a representative and the customer and notify the representative, e.g., on a screen of a computing device associated with the representative or any other consumer user, a feature request and/or a pain point that is identified by the feedback identification system 700 during the call. The feedback identification system 700 can perform a similar analysis with the ongoing call as with the recordings of the call in the offline mode.

Figure 11:
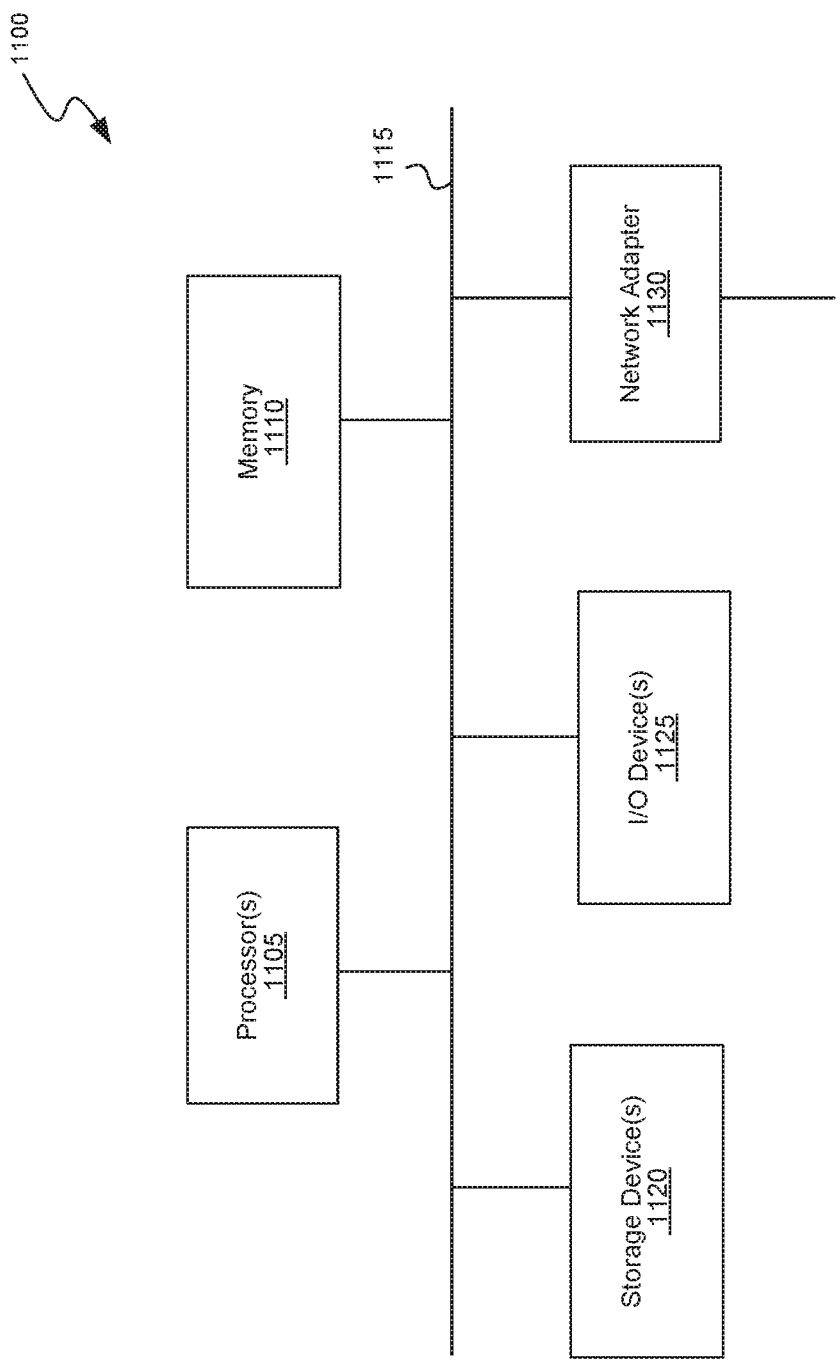
FIG. 11 is a block diagram of a processing system that can implement operations of the disclosed embodiments.

FIG. 11 is a block diagram of a computer system as may be used to implement features of the disclosed embodiments. The computing system 1100 may be used to implement any of the entities, components or services depicted in the examples of the foregoing figures (and any other components described in this specification). The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1110 and storage devices 1120 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
    retrieving multiple recordings of conversations associated with multiple representatives, wherein each of the conversations is between at least one of the representatives and at least one of multiple customers;
    extracting multiple features from each of the recordings, wherein the multiple features indicate characteristics of any of (a) a customer of multiple customers in the corresponding conversation, (b) a representative of multiple representatives in the corresponding conversation, (c) the corresponding conversation;
    analyzing features associated with a first conversation of the multiple conversations to determine a set of features that is indicative of a feature request for a product, wherein the feature request is a request made by a first customer of the multiple customers associated with the first conversation for adding one or more functionalities to the product; and
    generating, based on the set of features, information regarding the feature request.

2. The computer-implemented method of claim 1, wherein analyzing the features includes determining the set of features based on a usage of one or more words or phrases in the first conversation that are indicative of the feature request.

3. The computer-implemented method of claim 2, wherein determining the set of features includes determining a specified word or a specified phrase in the first conversation which is explicitly indicative of the feature request.

4. The computer-implemented method of claim 2, wherein determining the set of features includes determining a set of words or phrases in the first conversation based on which the feature request is implicit.

5. The computer-implemented method of claim 4, wherein determining the set of words or phrases based on which the feature request is implicit includes analyzing a portion of the first conversation prior to or after the set of words or phrases to determine the feature request that is implied.

6. The computer-implemented method of claim 1, wherein generating the information regarding the feature request includes generating the set of features, the set of features including one or more words or phrases in the first conversation that are indicative of the feature request.

7. The computer-implemented method of claim 1, wherein generating the information regarding the feature request includes generating a summary of the feature request.

8. The computer-implemented method of claim 7, wherein generating the summary of the feature request includes generating the summary by performing a semantic analysis of the set of features, the set of features including one or more words or phrases in the first conversation that are indicative of the feature request.

9. The computer-implemented method of claim 7, wherein generating the summary of the feature request includes generating the summary to include a context of the first conversation, the context including identification of the first customer or a first representative associated with the first conversation.

10. The computer-implemented method of claim 7, wherein the summary includes any information obtained using metadata associated with the first conversation.

11. The computer-implemented method of claim 7, wherein generating the summary includes generating the summary using any of a rule-based, artificial intelligence, machine-learning, or natural language processing techniques.

12. The computer-implemented method of claim 1, wherein retrieving the multiple recordings include retrieving a data stream associated with a real-time conversation between the first representative and the first customer.

13. The computer-implemented method of claim 12 further comprising:
    extracting one or more features from the real-time conversation that are indicative of the feature request associated with the product.

14. The computer-implemented method of claim 1, wherein extracting the features includes:
    generating features that include a transcription, vocabulary and a language model of the conversations as a first output.

15. The computer-implemented method of claim 14, wherein extracting the features includes:
    generating, using the first output, features that include semantic information from the conversations.

16. The computer-implemented method of claim 1, wherein extracting the features includes extracting a visual feature associated with a conversation of the conversations.

17. The computer-implemented method of claim 1, wherein extracting the features includes extracting the features using any of an artificial intelligence, a machine learning, or natural language processing technique.

18. The computer-implemented method of claim 1, wherein at least one of the recordings includes a recording of a video call between one of the customers and one of the representatives.

19. The computer-implemented method of claim 1, wherein at least one of the recordings includes an online meeting between one of the customers and one of the representatives.

20. The computer-implemented method of claim 1, wherein at least one of the recordings includes a recording of a virtual reality-based conversation between one of the customers and one of the representatives.

21. The computer-implemented method of claim 1, wherein at least one of the recordings includes a recording of an augmented reality-based conversation between one of the customers and one of the representatives.

22. The computer-implemented method of claim 1, wherein at least one of the multiple recordings includes an e-mail conversation between one of the customers and one of the multiple representatives.

23. A non-transitory computer-readable storage medium storing computer-readable instructions, comprising:
- instructions for retrieving a recording of a conversation associated with a representative and a customer;
- instructions for extracting multiple features from the recording, wherein the multiple features indicate characteristics of any of (a) the customer, (b) the representative, (c) the conversation;
- instructions for analyzing features associated with the conversation to determine a set of features that is indicative of a feature request for a product, wherein the feature request is a request made by the customer for adding one or more functionalities to the product; and
- instructions for generating information regarding the feature request, the information including one or more words or phrases in the conversation that are indicative of the feature request.

24. The non-transitory computer-readable storage medium of claim 23, wherein the instructions for generating the information include:
- instructions for generating a summary of the feature request, the summary generated based on the one or more words or phrases in the conversation that are indicative of the feature request.

25. The non-transitory computer-readable storage medium of claim 23, wherein the instructions for determining the set of features include:
- instructions for determining a set of words or phrases in the conversation based on which the feature request is implicit.

26. A system, comprising:
- a processor;
- a first component that is configured to extract multiple features from each of multiple recordings of conversations, wherein each conversation is associated with at least one of multiple customers and at least one of multiple representatives;
- a second component that is configured to analyze the features of each of the conversations to determine a first set of features that is indicative of a feature request for a product, wherein the feature request is a request made by a first customer of the multiple customers associated with the corresponding conversation for adding one or more functionalities to the product; and
- a third component that is configured to generate information regarding the feature request based on the set of features.

27. The system of claim 26, wherein the third component is further configured to generate the information by determining a set of words or phrases in one or more of the conversations that is indicative of the feature request implicitly.

* * * * *